United States Patent
Bhutani et al.

(10) Patent No.: US 12,519,881 B2
(45) Date of Patent: Jan. 6, 2026

(54) ROUTING DETERMINATION SYSTEMS AND METHODS

(71) Applicant: T-Mobile USA, Inc., Bellevue, WA (US)

(72) Inventors: Mayank Bhutani, Duvall, WA (US); Homer Nicolas B. Filart, Renton, WA (US); Dinko Dinkov, Kirkland, WA (US); Willie Dorance King, Austin, TX (US)

(73) Assignee: T-Mobile USA, Inc., Bellevue, WA (US)

( * ) Notice: Subject to any disclaimer, the term of this patent is extended or adjusted under 35 U.S.C. 154(b) by 335 days.

(21) Appl. No.: 18/364,539

(22) Filed: Aug. 3, 2023

(65) Prior Publication Data

US 2025/0047776 A1   Feb. 6, 2025

(51) Int. Cl.
*H04M 1/00*     (2006.01)
*H04L 65/1045*  (2022.01)
*H04L 65/1069*  (2022.01)
*H04M 1/72478*  (2021.01)

(52) U.S. Cl.
CPC .... *H04M 1/72478* (2021.01); *H04L 65/1045* (2022.05); *H04L 65/1069* (2013.01)

(58) Field of Classification Search
CPC ........... H04M 1/72478; H04L 65/1045; H04L 65/1069
See application file for complete search history.

(56) References Cited

U.S. PATENT DOCUMENTS

| | | | |
|---|---|---|---|
| 9,083,784 B2* | 7/2015 | Ku | H04W 8/04 |
| 10,887,811 B2* | 1/2021 | Kokengada | H04M 11/066 |
| 11,070,595 B1* | 7/2021 | Asveren | H04L 65/1036 |
| 11,895,195 B2* | 2/2024 | Pierrepont | H04L 43/0829 |
| 2019/0364466 A1* | 11/2019 | Doree | H04W 8/26 |
| 2021/0306383 A1 | 9/2021 | Muravlyannikov | |
| 2022/0070226 A1 | 3/2022 | Grover | |
| 2022/0232053 A1 | 7/2022 | Grover | |
| 2022/0329634 A1* | 10/2022 | Al-Damluji | H04L 65/1104 |
| 2023/0300201 A1 | 9/2023 | James | |

* cited by examiner

*Primary Examiner* — Khai M Nguyen
(74) *Attorney, Agent, or Firm* — Lee & Hayes, P.C.

(57) ABSTRACT

System and methods for performing routing determinations for communications requests for both assisted communications and non-assisted communications with devices operated by deaf or hard-of-hearing (DHH) users using a single number are described. A network component may determine whether to use routing that directs such requests to an assistance system based on the type of communications requested and one or more identifiers in a request. If a communications request includes a DHH user device's identifier and communications type that are represented in single number communications data, the network component may forward that request to an assistance system. Otherwise, the network component may route such a request normally.

20 Claims, 11 Drawing Sheets

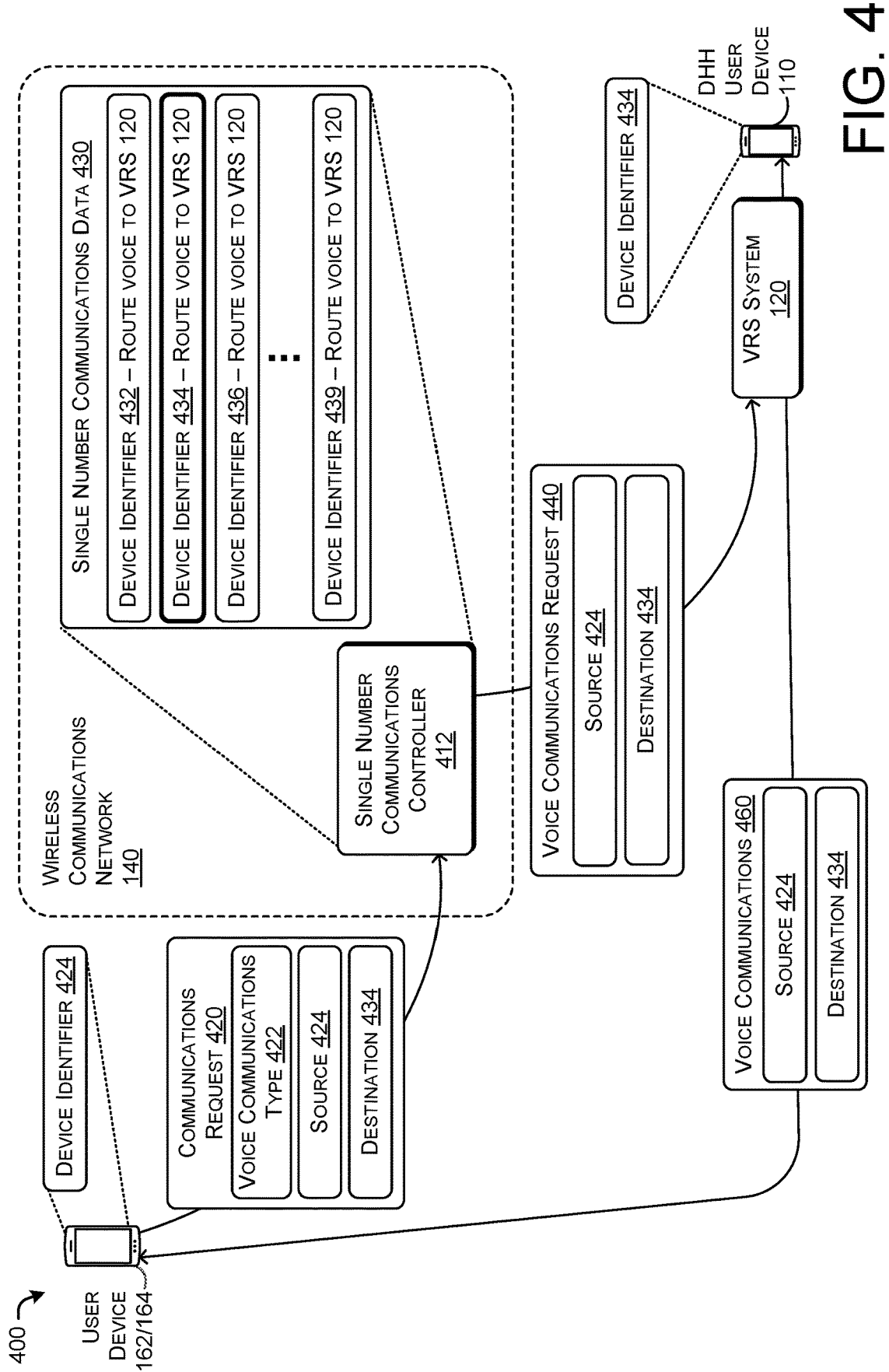

ROUTING DETERMINATION SYSTEMS AND METHODS

BACKGROUND

Systems to assist those with hearing disabilities (e.g., deaf or hard-of-hearing users, referred to herein as "DHH" users) with using telephones have been in use for many years. These systems have evolved as technology has progressed, improving the availability and usability of such systems. Many such assistance systems involve the use of third parties to facilitate communications between a hearing user and a DHH user. Such third parties may provide translation between spoken language and sign language to facilitate a conversation between such users, using video technology to present interpreted sign language to a DHH user. This type of service may be referred to as Video Relay Service (VRS).

The capabilities of modern communications devices and networks have expanded greatly over recent years, providing alternative communication channels to many users other than voice, such as video calling, text messaging, email instant messaging, etc. Many DHH users today frequently use video communications rather than assisted voice calls (e.g., when the other participant in the conversation is able to use sign language). However, voice calls remain of great value to the majority of users. For most users, a single telephone number can be used for voice as well as other types of communications (e.g., text, video, etc.). However, for DHH users, a different number is for assisted voice communications than for other types of communications because a third party or system (e.g., VRS, interpreter) is required to participate in an assisted voice call with a hearing user. Therefore, a hearing caller must use one number that contacts the third party in order to place a voice call to a DHH user, while using a second, different number for other forms of communication that may use standard telecommunications processing to communicate with a DHH user's device.

This presents a significant issue for a DHH user because the DHH user must provide two numbers to each contact with whom the DHH user may wish to communicate using a communications device. A DHH user's contacts may confuse the numbers or make note of only one since most current collections of personal information (e.g., contact information forms) collect a single number, assuming that both voice and other types of communications may be received at that number. This may result in contacts attempting to initiate non-voice communications with the DHH user's VRS number and/or place voice calls to a number at which the DHH user may only receive non-assisted types of communications.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 4 is a schematic diagram of illustrative functions and communications that may be implemented in a wireless communications network in which systems and methods for performing routing determinations may be implemented, in accordance with examples of the disclosure.

DETAILED DESCRIPTION

Overview

Figure 1:
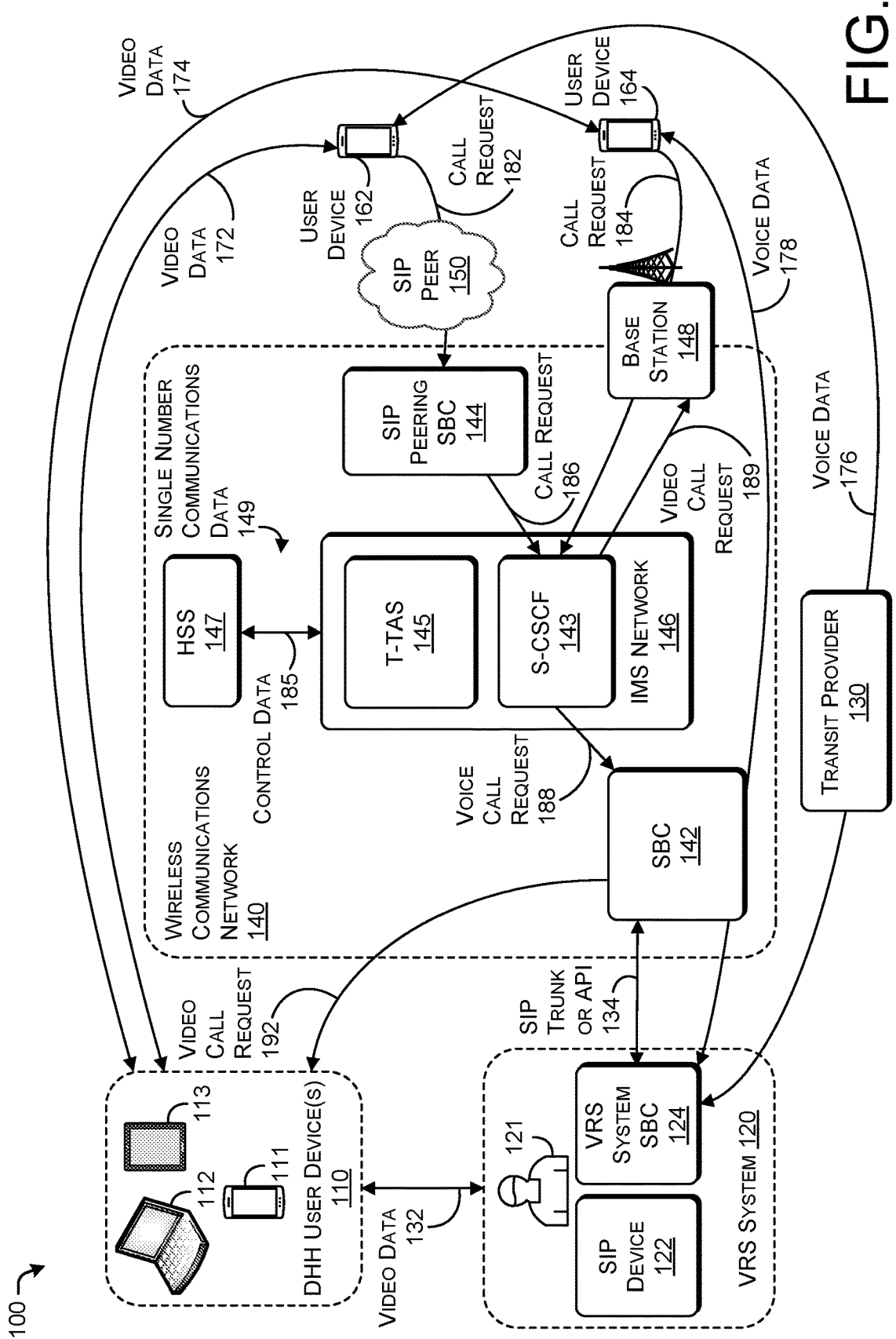
FIG. 1 is a schematic diagram of an illustrative wireless communication network environment in which systems and techniques for performing routing determinations may be implemented, in accordance with examples of the disclosure.

This disclosure is directed in part to systems and techniques for implementing routing determinations for communications of various types using a single number that may be initiated and/or received by a user equipment (UE) (e.g., smartphone, cell phone, mobile device, wireless communication device, mobile station, etc.) in advanced wireless communications networks. Such advanced networks include, but are not limited to, networks that support one or more 3GPP standards, including, but not limited to, Long Term Evolution (LTE) networks (e.g., 4G LTE networks) and New Radio (NR) networks (e.g., 5G NR networks); one or more IETF standards; one or more IEEE standards (e.g., any one or more of the IEEE 802.11 standards); and/or any other industry standards and/or specifications. However, the disclosed systems and techniques may be applicable in any network or system in which a user device may initiate, receive, or otherwise establish communications with another device or system using any protocol.

A DHH user may have access to a voice communications assistance service or system ("assisted voice communications system"), such as a video relay service (VRS) or a video interpreting service (VIS) (generally referred to herein as "VRS"), that allows voice calls with the DHH user and a hearing user to be facilitated by an interpreter (e.g., human interpreter) who interprets spoken language audio content from a hearing user into sign language that is then presented to the DHH user as video content. An interpreter (e.g., the same interpreter or a separate interpreter) may be presented with video content including the DHH user's sign language and interpret the sign language into spoken language that may be provided to the hearing user as audio content. In some examples, the hearing user may also be presented with video content including the interpreter and/or the DHH user.

An "interpreter" as used herein may also, or instead, be an artificial intelligence (AI) system and/or machine-learned model-executing system that may recognize and/or generate sign language and/or otherwise interpret sign language into audio and/or text content and/or vice versa. In examples, a voice communications assistance service or system may also, or instead, include IP and/or internet relay services (e.g., telecommunication relay services), hearing carry-over services, voice carry-over services, and speech-to-speech services. As used herein, "VRS," "assistance service," and "assistance system" may refer to any such services, any other systems and/or services performing any of the assistance operations and functions described herein, and any combination thereof.

Due to the involvement of an assistance system and one or more interpreters, in conventional systems, a DHH user may be assigned a separate number for voice calls that are routed to the assistance system, which then establishes the audio and video communications needed to facilitate spoken language and sign language interpretation between the DHH user and a hearing user. This assistance number may serve as the destination number when used to place a call to the DHH user and/or as a source number when used by the DHH user to place a voice call (e.g., using an app on the DHH user's mobile device). The DHH user may use the same mobile device for receiving and placing voice calls as well as engaging in other forms of communication, such as video calling, text messages, instant messaging, etc. Because the non-standard voice types of communications (e.g., video calls) may not require additional or non-standard processing, systems, or services, the DHH user may use the mobile device's number (e.g., a number provided by a wireless provider and/or associated with the device, the SIM, etc.) for such types of communications. As will be appreciated, this use of two separate and distinct numbers to engage in multiple forms of communication on a single device can be inconvenient for a user and results in inefficient use of device and network resources.

To address the inefficiencies and inconvenience of using multiple numbers for different communication types on a single device, one or more wireless network components may be configured to process communications requests using single number communications data to automatically determine routing for such requests, for example, to an assistance system for voice calls or directly to a DHH UE for non-voice communications, such as video calls, according to the systems and techniques described herein.

In various examples, a wireless communications network may generate and maintain one or more data structures that may be accessed to determine whether to route a communications request to an assistance system for assisted call establishment or to route the communications request using normal routing procedures. A component or function (or any combination of components and/or functions) on the wireless communications network may serve as a single number communications controller. A single number communications controller and/or any of the functions associated therewith may be implemented as a dedicated (e.g., stand-alone) network component or at one or more network components that also perform other operations. In examples, the functions of a single number communications controller may be distributed across multiple components. Such components may be physical and/or logical components.

In examples, a single number communications controller may be implemented at a session border controller (SBC). In particular examples, an SBC may be configured to implement, or otherwise perform operations associated with, a call session control function (CSCF), such as a serving CSCF (S-CSCF) and/or an interrogating CSCF (I-CSCF). An SBC, CSCF, and/or single number communications controller may also, or instead, be configured to implement, or otherwise perform operations associated with, a telephony application server (TAS), such as a terminating TAS (T-TAS). Any combination of one or more of these functions may perform one or more of the single number communications controller operations described herein. In other examples, another component of a device within a wireless communications network may perform such functions. As used herein, a "single number communications controller" refers to any one or more components, systems, devices, and/or any combination thereof configured to perform the operations associated with a single number communications controller and the routing determination operations as described herein.

In various examples, single number communications data used to determine appropriate routing for a communications request may be stored in one or more data structures accessible by and/or stored at a single number communications controller. In particular examples, single number communications data may be stored as initial filter criteria (iFC). Such iFC may be stored at a home subscriber server (HSS) and may be loaded onto (e.g., during IMS registration (e.g., by a CSCF)), stored at, or otherwise accessible to a CSCF. In other examples, single number communications data used to determine whether to route communications requests to an assistance system may be stored at any one or more components, systems, devices, and/or any combination thereof configured to provide the single number communications data processed by a single number communications controller as described herein.

In examples, a DHH user may request a single number communications routing configuration for the DHH user's telephone number and/or other device or user identifier, such as a mobile station international subscriber directory number (MSISDN), an international mobile subscriber identity (IMSI), a telephone number, a network address (e.g., IP address), a uniform resource identifier (URI), or any combination thereof. The DHH user may provide such a request to a network operator using a graphical user interface presented to the user by an operator system. This interface may allow the user to select or indicate a particular assistance system (e.g., VRS system) to which voice communications requests indicating the user's mobile device are to be routed. This interface may also, or instead, allow the user to select or indicate a direct routing to a particular UE for particular types of communications requests indicating the user's mobile device, such as video calls.

A communications request as described herein may be any request for the establishment of a communications session of any type or a request for any other form of communications. For example, a communications request may be a session initiation protocol (SIP) message, such as a SIP INVITE message, requesting the establishment of a voice call between a source device and a destination device. Alternatively or additionally, a communications request may be a SIP message, such as a SIP INVITE message, requesting the establishment of a video call between a source device and a destination device. Such a SIP INVITE may specify source and destination device identifiers (e.g., telephone numbers, IMSIs, MSIDSNs, addresses, etc.) and a type of communication requested (e.g., voice, video, messaging, etc.).

In examples, a single number communications controller may receive a communications request from a source device, for example, via one or more components within a wireless communications network (e.g., from a base station configured in the wireless communications network and in communication with the source device, from a peer network, etc.). The single number controller may process the communications request to determine whether to route the request based on normal (e.g., standard) routing procedures or to route the request to an assistance system. For example, the single number communications controller may determine whether the communications request is a request to establish a voice communications session or a video communications session. If the communications request is a request for voice communications (e.g., standard voice call), the single number communications controller may determine, based on single number communications data (e.g., iFC), to route the request to an assistance system (e.g., VRS). If the communications request is a request for video communications (e.g., standard voice call), the single number communications controller may determine, based on single number communications data (e.g., iFC), to route the request to the device associated with the destination device identifier.

The single number communications controller may determine a voice/video property of the request based on explicit and/or implicit data associated with the request. For example, the single number communications controller may implicitly determine that a SIP INVITE message is a request to establish a voice communications session because is it a SIP message. Alternatively or additionally, the single number communications controller may explicitly determine a voice/video property of the request based on an explicit indication within or associated with the request, such as the value of a field represented in the request that may indicate a communications type.

If the single number communications controller determines that the communications request is a request to establish a video communications session, the single number communications controller may determine to process the request as a video call and/or evaluate the request against single number communications data to determine whether to process the request as a video call. For example, the single number communications controller may determine whether the destination identifier (e.g., telephone number, MSISDN, IMSI, address, etc.) indicated in the request is represented in the single number communications data (e.g., iFC) as being associated with video calling.

If the single number communications controller determines that the communications request is a request to establish a voice communications session and, in some examples, that the destination identifier is associated with an assistance system or assisted calling, it may determine a particular assistance system (e.g., VRS system) associated with the destination identifier (e.g., as represented in single number communications data (e.g., iFC)). Alternatively or additionally, the single number communications controller may be configured to use a default assistance system (e.g., for all assistance system-associated destination identifiers and/or for those assistance system-associated destination identifiers that are not associated with a particular assistance system). The single number communications controller may then route the request to the determined assistance system or generate another communications request to be transmitted to the determined assistance system based on the received communications request. If the single number communications controller determines that the communications request is a request to establish a voice communications session, but that the destination identifier is not associated with an assistance system or assisted calling, it may route or otherwise process the request as a standard (e.g., unassisted) voice call request.

By facilitating the more efficient and convenient routing of voice and video calls to appropriate destination systems (e.g., assistance system or UE, respectively) without requiring the use of another number for other types of communications, systems and methods described herein can improve the performance and increase the efficiency of network resources (and therefore UE resources), while improving the user experience by ensuring that assisted calls are easily and efficiently processed while video call s are not unnecessarily routed to assistance systems. For example, the methods and systems described herein may be more efficient and/or more robust than conventional techniques utilizing two numbers, as they may increase the efficiency of UE and network resource utilization by initially routing both voice communications requests and video communications requests properly. This prevents the waste of resources that occurs when users attempt to use a number for a type of communications for which it is not configured (e.g., use an assisted call number for a video or send a request for a video call to an assisted call number). This reduces the overall utilization of network resources communications by eliminating unnecessary resource utilization resulting from user number confusion. In addition to improving the efficiency of network and device resource utilization, the systems and methods described herein can provide more robust systems by, for example, making more efficient use of network devices and user devices by reducing unnecessary device and network operations, thereby freeing network and user device resources for more productive operations.

Illustrative environments, signal flows, and techniques for implementing systems and techniques for performing routing determinations for communications of various types using a single number are described below. However, the described systems and techniques may be implemented in other environments.

Illustrative System Architecture

FIG. 1 is a schematic diagram of an illustrative wireless network environment 100 in which the disclosed systems and techniques may be implemented. The environment 100 may include a DHH user device(s) 110 that may communicate (e.g., wirelessly) with a wireless communications network 140 (e.g., via a base station). The DHH user device(s) 110 may include one or more communications devices of any type, such as a UE 111, a computer 112, and/or a tablet 113, any of which may be configured to interact with the wireless communications network 140 and/or an assistance system such as VRS system 120.

The wireless communications network 140 may be any one or more networks that facilitate communications between devices of various types, such as computing devices and mobile devices (e.g., UEs). Various connections between devices in the network 140 may be wired, wireless, physical, logical, or a combination thereof. In various embodiments, the wireless communications network 140 may facilitate voice and data communications between one or more wireless devices, such as UEs. The wireless communications network 140 may facilitate voice and data communications using packet-based communications technologies between such wireless devices and devices on the Internet and/or one or more systems and devices external to the wireless communications network 140. For example, the wireless communications network 140 may facilitate communications between the DHH user device(s) 110 and a user device 162 that may communicate with the wireless communications network 140 from another network via SIP peer 150. The wireless communications network 140 may also, or instead, facilitate communications between the DHH user device(s) 110 and a user device 164 that may communicate with the wireless communications network 140 via a base station 148 configured at the wireless communication network 140 (e.g., the user of device 164 may also be a customer of the wireless communications network 140).

The wireless communications network 140 may also, or instead, facilitate communications between the VRS system 120 and the DHH user device(s) 110.

Alternatively or additionally, the VRS system 120 and the DHH user device(s) 110 may communicate via one or more other networks (e.g., transit provider 130). The VRS system 120 may include a VRS system SBC 124 and one or more SIP-enabled devices 122 that allow the VRS system 120 to establish and facilitate assisted communications between the DHH user device(s) 110 and one or more other devices (e.g., user devices 162 and/or 164). The VRS system 120 may also include one or more users 121 that provide assistance by performing sign language/spoken language translations and perform other tasks to facilitate assisted calls. Note that user 121 may be one or more human users, AI processes, machine-learned model execution systems, interpreters of any type, etc.

The wireless communications network 140 may include an SBC 142 that may perform one or more of the single number communications controller operations described herein. The wireless communications network 140 may also, or instead, include an S-CSCF 143 that may perform one or more of the single number communications controller operations described herein. The wireless communications network 140 may also, or instead, include a T-TAS 145 that may perform one or more of the single number communications controller operations described herein. One or both of the S-CSCF 143 and the T-TAS 145 may be components of and/or functions in an IP multimedia system or subsystem (IMS) network 146. The IMS network 146 may facilitate packet data communications between various devices and systems. In examples, the IMS network 146 may represent and/or include one or more packet data networks (PDNs) of any type.

The wireless communications network 140 may also, or instead, include an HSS 147 that may perform one or more of the single number communications controller operations described herein. In various examples, any combination or subset of the SBC 142, the S-CSCF 143, the T-TAS 145, and the HSS 147 may interoperate to perform one or more of the single number communications controller operations described herein. In performing such operations, the S-CSCF 143, the T-TAS 145, and the HSS 147 (and, in some examples, the SBC 142) may exchange single number communications data 149 in any manner. In examples, single number communications data 149 may include iFCs that provide routing data for voice and video calls as described in more detail herein. For example, the HSS 147 may provide iFCs that provide routing data for voice and video calls as single number communications data 149 to the S-CSCF 143 and/or one or more other components of the IMS network 146.

The wireless communications network 140 may also, or instead, include a SIP peering SBC 144 that may perform SBC functions while interacting with a peer network, such as SIP peer 150. The SIP peering SBC 144 may also, or instead, perform one or more of the single number communications controller operations described herein. For example, the SIP peering SBC 144 may interoperate with one or more of the S-CSCF 143, the T-TAS 145, and the HSS 147 to perform one or more of the single number communications controller operations described herein and/or to exchange single number communications data 149 in any manner (connections between the SIP peering SBC 144 and these functions not shown in FIG. 1).

The wireless communications network 140 may also, or instead, include a base station 148 that facilitates wireless communication with user devices, such as user device 164. As will be appreciated, the wireless communications network 140 may include many other devices, systems, components, functions, and connections, not all of which will be described herein. Any of the examples described herein may include any one or more of such devices, systems, components, functions, and connections and/or one or more operations performed thereby.

In examples, communications of various types may be initiated, established, conducted, and facilitated by the various entities illustrated in FIG. 1. For example, video data 172 may be exchanged between the user device 162 and one or more of the DHH user devices 110, outside of the wireless communications network 140 using conventional techniques. Similarly, video data 174 may be exchanged between the user device 164 and one or more of the DHH user devices 110, outside of the wireless communications network 140 using conventional techniques. Voice data 178 may be exchanged between the VRS system 120 and the user device 164 via the wireless communications network 140 so that the VRS system 120 may provide assisted communications (e.g., video data 132 that may include video of interpreted spoken language received as voice data 178) to one or more of the DHH user devices 110. Alternatively or additionally, one or more transit providers 130 may facilitate the exchange of voice data 176 between the VRS system 120 and the user device 162 so that the VRS system 120 may provide assisted communications (e.g., video data 132 that may include video of interpreted spoken language received as voice data 176) to one or more of the DHH user devices 110.

Data (of any type) intended for or originating at the DHH user device(s) 110, or for use in establishing communications with the DHH user device(s) 110, may transit the wireless communication network 140. For example, the user device 162 may transmit a call request 182 via the SIP peer 150 to the wireless communications network 140. The SIP peering SBC 144 may be configured to receive and process peer traffic from the SIP peer 150. For example, the SIP peering SBC 144 may perform one or more single number communications controller operations using single number communications data to determine whether to route such traffic normally or to direct such traffic to an assistance system, such as the VRS system 120. Alternatively or additionally, the SIP peering SBC 144 may be configured to determine another component or system to direct such traffic to for further processing. For example, the SIP peering SBC 144 may determine that the call request 182 received from the user device 162 may be destined for the DHH user device(s) 110 and may, in response, direct a call request 186 (based on the call request 182 and/or as a relay of the call request 182) to the S-CSCF 143 for further processing.

The S-CSCF 143 may, based on the call request 186 associated with the DHH user device(s) 110, perform one or more single number communications controller operations using single number communications data to determine whether to route such a request to the DHH user device(s) 110 or to the VRS system 120. If the S-CSCF 143 determines that the call request 186 is associated with a video call (based on interaction and/or exchange of control data 185 with the HSS 147, based on interaction and/or exchange of data with the T-TAS 145, and/or based on single number communications data (e.g., iFC data received, for example, from the HSS 147)), the S-CSCF 143 may route the call request normally (e.g., to the DHH user device(s) 110 as a video call). For example, the S-CSCF 143 facilitate the set-up of a video call and the exchange of video data 172 with the user device 162 by transmitting a video call request 189 to the DHH user device(s) 110 via the base station 148 and/or transmitting a video call request 192 to the DHH user device(s) 110 using other means. In examples, the T-TAS 145 may operate as and/or interact with a video communications system to establish and execute a video call and/or video communications session.

If the S-CSCF 143 determines that the call request 186 (based on the call request 182) associated with the DHH user device(s) 110 is a request to establish a voice call between the user device 162 and the DHH user device(s) 110 (based on interaction and/or exchange of control data 185 with the HSS 147, based on interaction and/or exchange of data with the T-TAS 145, and/or based on single number communications data (e.g., iFC data received, for example, from the HSS 147)), the S-CSCF 143 may determine an assistance system associated with the DHH user device(s) 110 (e.g., in single number communications data and/or based on a configured default assistance system), such as VRS system 120.

Based on determining that the call request 186 is a voice communications request to be routed to an assistance system, the S-CSCF 143 may route the request accordingly. For example, the S-CSCF 143 may transmit a voice call request 188 based on the call request 186 to the SBC 142, which may relay the request via a SIP trunk or an application programming interface (API) 134 to the VRS system SBC 124 of the VRS system 120. The VRS system SBC 124 may then establish a call between the DHH user device(s) 110 and the user device 162, for example, by establishing a voice communications session connecting the SIP device 122 to the user device 162 via the transit provider 130 to exchange voice data 176 with an interpreter 121, and then establishing a video communications session between the SIP device 122 and the DHH user device(s) 110 to exchange video data 132. The requested voice call may then be facilitated by the VRS system 120.

In other examples, data (of any type) may be exchanged between the DHH user device(s) 110 and other users (e.g., customers) of the wireless communication network 140. For example, the user device 164 may be a device operated by a customer of the operator of the wireless communications network 140. Accordingly, the user device 164 may transmit a call request 184 with, for example, the DHH user device(s) 110 (e.g., an identifier of the DHH user device(s) 110) as a destination, to the wireless communications network 140 via the base station 148, which may facilitate transmission of the call request 184 to the IMS network 146. The IMS network 146 may direct the call request 184 to the S-CSCF 143 within the IMS network 146 for further processing. The call request 184 may be based on the call request 184 and/or a relay of the call request 184.

The S-CSCF 143 may, based on the call request 184 associated with the DHH user device(s) 110, perform one or more single number communications controller operations using single number communications data to determine whether to route this request as a video call request to the DHH user device(s) 110 or a voice call request associated with an assistance system to the VRS system 120. If the S-CSCF 143 determines that the call request 184 is associated with a video call ((based on interaction and/or exchange of control data 185 with the HSS 147, based on interaction and/or exchange of data with the T-TAS 145, and/or based on single number communications data (e.g., iFC data received, for example, from the HSS 147)), the S-CSCF 143 may route the call request normally (e.g., to the DHH user device(s) 110 as a video call). For example, the S-CSCF 143 facilitate the set-up of a video call and the exchange of video data 174 with the user device 164 by transmitting a video call request 189 to the DHH user device(s) 110 via the base station 148 and/or transmitting a video call request 192 to the DHH user device(s) 110 using other means. In examples, the T-TAS 145 may operate as and/or interact with a video communications system to establish and execute a video call and/or video communications session.

If the S-CSCF 143 determines that the call request 184 associated with the DHH user device(s) 110 is a request to establish a voice call between the user device 164 and the DHH user device(s) 110 (based on interaction and/or exchange of control data 185 with the HSS 147, based on interaction and/or exchange of data with the T-TAS 145, and/or based on single number communications data (e.g., iFC data received, for example, from the HSS 147)), the S-CSCF 143 may determine an assistance system associated with the DHH user device(s) 110 (e.g., in single number communications data and/or based on a configured default assistance system), such as VRS system 120.

Based on determining that the call request 184 is a voice communications request to be routed to an assistance system, the S-CSCF 143 may route the request accordingly. For example, the S-CSCF 143 may transmit a voice call request 188 to the SBC 142 for transmission via the SIP trunk or API 134 to the VRS system SBC 124 of the VRS system 120. The VRS system SBC 124 may then establish a call between the DHH user device(s) 110 and the user device 164, for example, by establishing a voice communications session connecting the SIP device 122 to the user device 164 via various components of the wireless communications network 140 (e.g., IMS network 146, base station 148, etc.) to exchange voice data 178 with an interpreter 121, and then establishing a video communications session between the SIP device 122 and the DHH user device(s) 110 to exchange video data 132. The requested voice call may then be facilitated by the VRS system 120.

Illustrative Signal Flows

Figure 2A:
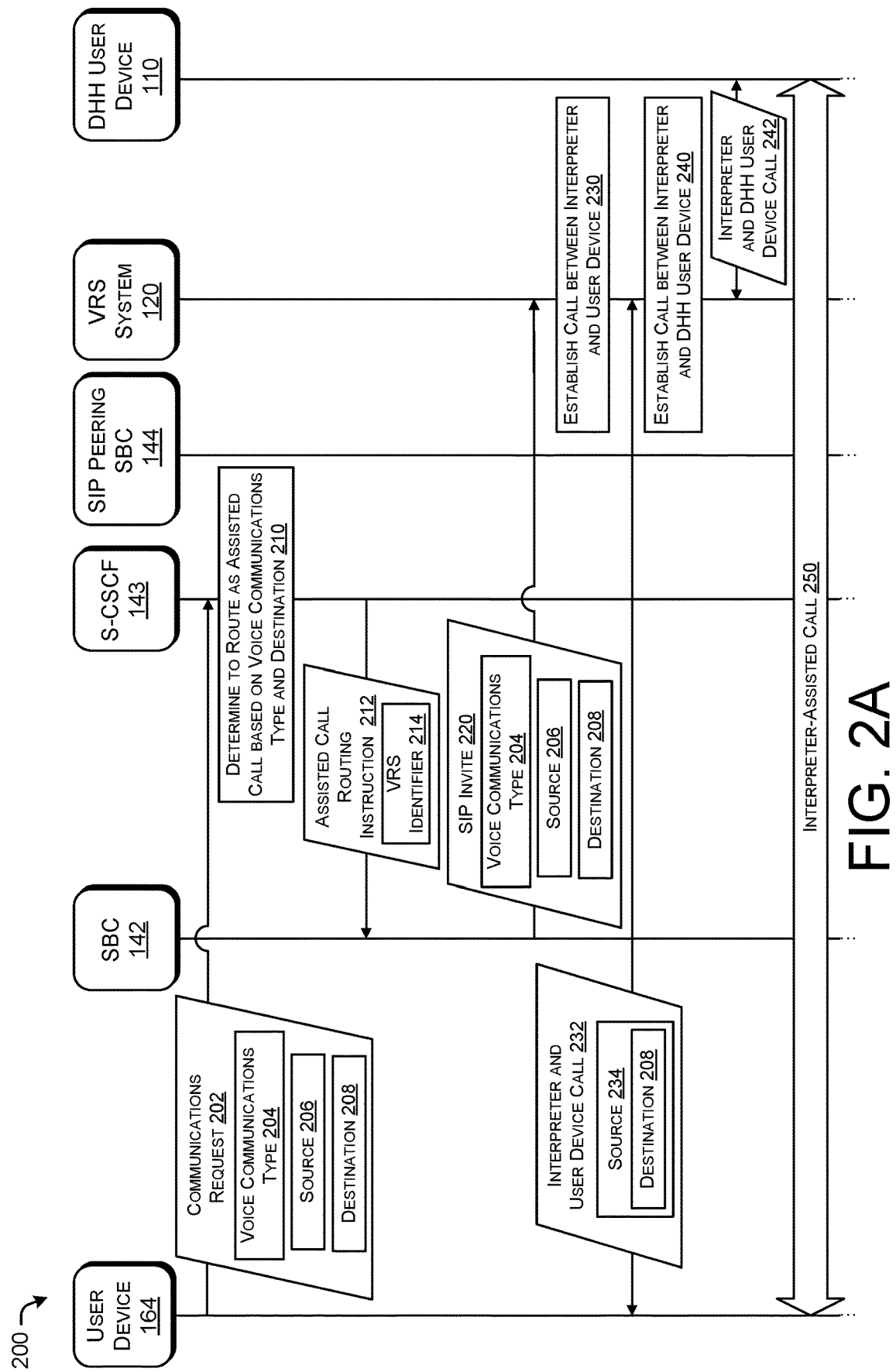
FIGS. 2A and 2B are diagrams of illustrative signal flows associated with systems and techniques for performing routing determinations, in accordance with examples of the disclosure.
Figure 2B:
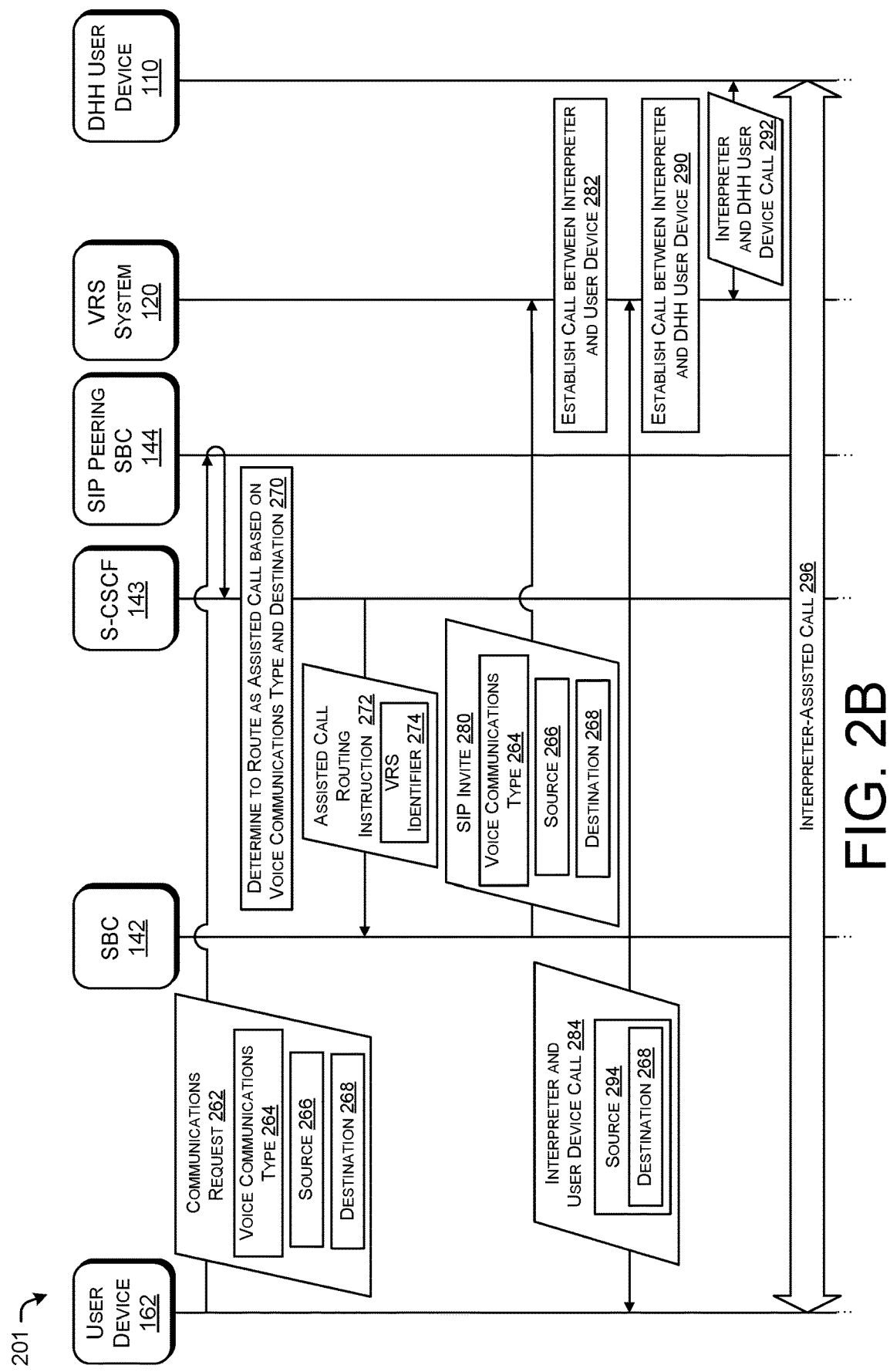

FIGS. 2A and 2B illustrates exemplary signal flows 200 and 201, respectively, of various messages that may be exchanged in one or more of the disclosed systems and techniques for performing routing determinations using single number communications data. Reference may be made in this description of the signal flows 200 and 201 to devices, entities, functions, components, and/or interfaces illustrated in FIG. 1 and described in regard to that figure. However, the operations, signals, and signal flow illustrated in FIGS. 2A and 2B and described herein may be implemented in any suitable system and/or with any one or more suitable devices and/or entities. Moreover, any of the operations, signals, and/or entities described in regard to FIGS. 2A and 2B may be used separately and/or in conjunction with other operations, signals, and/or entities. All such embodiments are contemplated as within the scope of the instant disclosure.

Signal flow 200 of FIG. 2A illustrates an example of signals that may be exchanged and operations that may be performed based on a user device operating on the same wireless communications network as a DHH user device and requesting the establishment of a voice call between the user device and a DHH user device according to systems and techniques disclosed herein. In this example, user device 164 may transmit a communications request 202 to a wireless communications network where it may be received at the S-CSCF 143. The communications request 202 may be any type of communications request, including a request to establish a packet-based and/or multimedia telephony service (MMTel) voice communications session. The communications request 202 may include a voice communications type 204 indicating that the communications request 202 is requesting the establishment of a voice communications session (e.g., of a particular type, such as a particular packet-based voice communications session or an MMTel voice communications session). The communications request 202 may further include an indication of a source 206, which may be an identifier for the user device 164, such as a telephone number, IMSI, MSISDN, network address, etc. The communications request 202 may further include an indication of a destination 208, which may be an identifier for a device with which the user device 164 is requesting establishment of a communications session, in this example, the DHH user device 110. The destination identifier may also be an identifier such as a telephone number, IMSI, MSISDN, network address, etc. In various examples, the communications request 202 may be a SIP INVITE message.

In various examples, where the communications request 202 is transmitted by the user device 164 operating on the same network on which the S-CSCF 143 is configured, the communications request 202 may be received substantially directly at the S-CSCF 143 (e.g., without traversing a session border controller such as the SBC 142).

The S-CSCF 143, at operation 210 and based on the request 202, may determine that the request 202 is a request for a voice call and is associated with an entry in single number communications data indicating that an assistance system is to be used for the requested voice call. For example, the entry in the single number communications data may indicate that voice calls associated with the destination 208 and/or the DHH user device 110 are to be routed to a VRS system 120. In particular examples, iFC data in the single number communications data may indicate that MMTel voice calls or MMTel calls that are not video calls associated with the destination 208 are to be routed to the VRS system 120. In various examples, the single number communications data used to make this determination may be iFC data stored at the S-CSCF 143. In examples, the S-CSCF 143 may download or otherwise obtain such iFC data from an HSS (e.g., HSS 147) and/or from one or more other systems or components and use such data to evaluate requests as described herein.

In response to determining that the VRS system 120 is to be used to facilitate voice calls such as that requested by the communications request 202, the S-CSCF 143 may transmit assisted call routing instruction 212 to the SBC 142. The assisted call routing instruction 212 may include an indication of the VRS system associated with the destination 208 and/or the DHH user device 110 (e.g., as indicated in an iFC, single number communications data, by default, etc.). In various embodiments, the assisted call routing instruction 212 may be a SIP INVITE message similar to the communications request 202 instructing or causing the SBC 142 to initiate an assisted call using the VRS system 120 (e.g., a SIP INVITE message with the sources identifier indicating the user device 164 and/or the VRS identifier 214 as the destination).

In response to the assisted call routing instruction 212, the SBC 142 may transmit a SIP INVITE 220 to the VRS system 120 via the SIP peering SBC 144 that includes the voice communications type 204 indication and/or related data, the source 206, and the destination 208. Alternatively, where the VRS system 120 is operating on the same network as the SBC 142 and the S-CSCF 143, the SBC 142 may transmit the SIP INVITE 220 substantially directly to the VRS system 120 (e.g., without traversing the SIP peering SBC 144).

At operation 230, based on the SIP INVITE 220, the VRS system 120 may establish a communications session between an interpreter and the user initiating the request for a communications session, in this case the user associated with the user device 164 (e.g., between their respective devices). This session may be a voice session or may be a video and audio data session allowing the hearing user to also view the interpreter and/or the DHH user associated with the DHH user device 110. The VRS system 120 (e.g., an SBC at the VRS system 120, such as the VRS system SBC 124) may establish the call using the DHH user device identifier (e.g., telephone number) as the source address so that the user of the user device 164 may see that the call is associated with the user of the DHH user device 110. For example, as shown here, the VRS system 120 may establish a call 232 between the user device 164 and the VRS system 120 with a source 234 that is the destination 208 associated with the DHH user device 110 from the initial communications request 202.

At operation 240, based on successful establishment of the call 232, the VRS system 120 may establish a communications session between the interpreter and the DHH user associated with the DHH user device 110 (e.g., between their respective devices). This session may be a video data session allowing the DHH user to view the interpreter. This communications session may also allow the DHH user to view the hearing user operating the user device 164. For example, as shown here, the VRS system 120 may establish a call 242 between the DHH user device 110 and the VRS system 120 that may be a video call and/or otherwise include video data allowing the DHH user operating the DHH user device 110 to view the interpreter at the VRS system 120.

Based on successful establishment of the call 242, the VRS system 120 may establish a communications session connecting the interpreter at the VRS system 120 with both the DHH user associated with the DHH user device 110 and the hearing user associated with the user device 164 (e.g., communicatively connecting their respective devices). The VRS system 120 may then facilitate this interpreter-assisted call 250.

Signal flow 201 of FIG. 2B illustrates an example of signals that may be exchanged and operations that may be performed based on a user device operating on a different wireless communications network than a DHH user device and requesting the establishment of a voice call between the user device and a DHH user device according to systems and techniques disclosed herein. In this example, user device 162 may transmit a communications request 262 to a wireless communications network where it may be received at the S-CSCF 143 via the SIP peering SBC 144. The communications request 262 may be any type of communications request, including a request to establish a packet-based and/or MMTel voice communications session. The communications request 262 may include a voice communications type 264 indicating that the communications request 262 is requesting the establishment of a voice communications session (e.g., of a particular type, such as a particular packet-based voice communications session or an MMTel voice communications session). The communications request 262 may further include an indication of a source 266, which may be an identifier for the user device 162, such as a telephone number, IMSI, MSISDN, network address, etc. The communications request 262 may further include an indication of a destination 268, which may be an identifier for a device with which the user device 162 is requesting establishment of a communications session, in this example, the DHH user device 110. The destination identifier may also be an identifier such as a telephone number, IMSI, MSISDN, network address, etc. In various examples, the communications request 262 may be a SIP INVITE message.

In various examples, where the communications request 262 is transmitted by the user device 162 operating on a different network than the network on which the S-CSCF 143 is configured, the communications request 262 may be received initially at a session border controller, such as the SIP Peering SBC 144, and then relayed or otherwise conveyed to the S-CSCF 143.

The S-CSCF 143, at operation 270 and based on the request 262, may determine that the request 262 is a request for a voice call and is associated with an entry in single number communications data indicating that an assistance system is to be used for the requested voice call. For example, the entry in the single number communications data may indicate that voice calls associated with the destination 268 and/or the DHH user device 110 are to be routed to a VRS system 120. In particular examples, iFC data in the single number communications data may indicate that MMTel voice calls or MMTel calls that are not video calls associated with the destination 268 are to be routed to the VRS system 120. In various examples, the single number communications data used to make this determination may be iFC data stored at the S-CSCF 143. In examples, the S-CSCF 143 may download or otherwise obtain such iFC data from an HSS (e.g., HSS 147) and/or from one or more other systems or components and use such data to evaluate requests as described herein.

In response to determining that the VRS system 120 is to be used to facilitate voice calls such as that requested by the communications request 262, the S-CSCF 143 may transmit assisted call routing instruction 272 to the SBC 142. The assisted call routing instruction 272 may include an indication of the VRS system associated with the destination 268 and/or the DHH user device 110 (e.g., as indicated in an iFC, single number communications data, by default, etc.). In various embodiments, the assisted call routing instruction 272 may be a SIP INVITE message similar to the communications request 262 instructing or causing the SBC 142 to initiate an assisted call using the VRS system 120 (e.g., a SIP INVITE message with the sources identifier indicating the user device 162 and/or the VRS identifier 274 as the destination).

In response to the assisted call routing instruction 272, the SBC 142 may transmit a SIP INVITE 280 to the VRS system 120 via the SIP peering SBC 144 that includes the voice communications type 264 indication and/or related data, the source 266, and the destination 268. Alternatively, where the VRS system 120 is operating on the same network as the SBC 142 and the S-CSCF 143, the SBC 142 may transmit the SIP INVITE 280 substantially directly to the VRS system 120 (e.g., without traversing the SIP peering SBC 144).

At operation 282, based on the SIP INVITE 280, the VRS system 120 may establish a communications session between an interpreter and the user initiating the request for a communications session, in this case the user associated with the user device 162 (e.g., between their respective devices). This session may be a voice session or may be a video and audio data session allowing the hearing user to also view the interpreter and/or the DHH user associated with the DHH user device 110. The VRS system 120 (e.g., an SBC at the VRS system 120, such as the VRS system SBC 124) may establish the call using the DHH user device identifier (e.g., telephone number) as the source address so that the user of the user device 162 may see that the call is associated with the user of the DHH user device 110. For example, as shown here, the VRS system 120 may establish a call 284 between the user device 162 and the VRS system 120 with a source 294 that is the destination 268 associated with the DHH user device 110 from the initial communications request 262.

At operation 290, based on successful establishment of the call 284, the VRS system 120 may establish a communications session between the interpreter and the DHH user associated with the DHH user device 110 (e.g., between their respective devices). This session may be a video data session allowing the DHH user to view the interpreter. This communications session may also allow the DHH user to view the hearing user operating the user device 162. For example, as shown here, the VRS system 120 may establish a call 292 between the DHH user device 110 and the VRS system 120 that may be a video call and/or otherwise include video data allowing the DHH user operating the DHH user device 110 to view the interpreter at the VRS system 120.

Based on successful establishment of the call 292, the VRS system 120 may establish a communications session connecting the interpreter at the VRS system 120 with both the DHH user associated with the DHH user device 110 and the hearing user associated with the user device 162 (e.g., communicatively connecting their respective devices). The VRS system 120 may then facilitate this interpreter-assisted call 296.

Figure 3A:
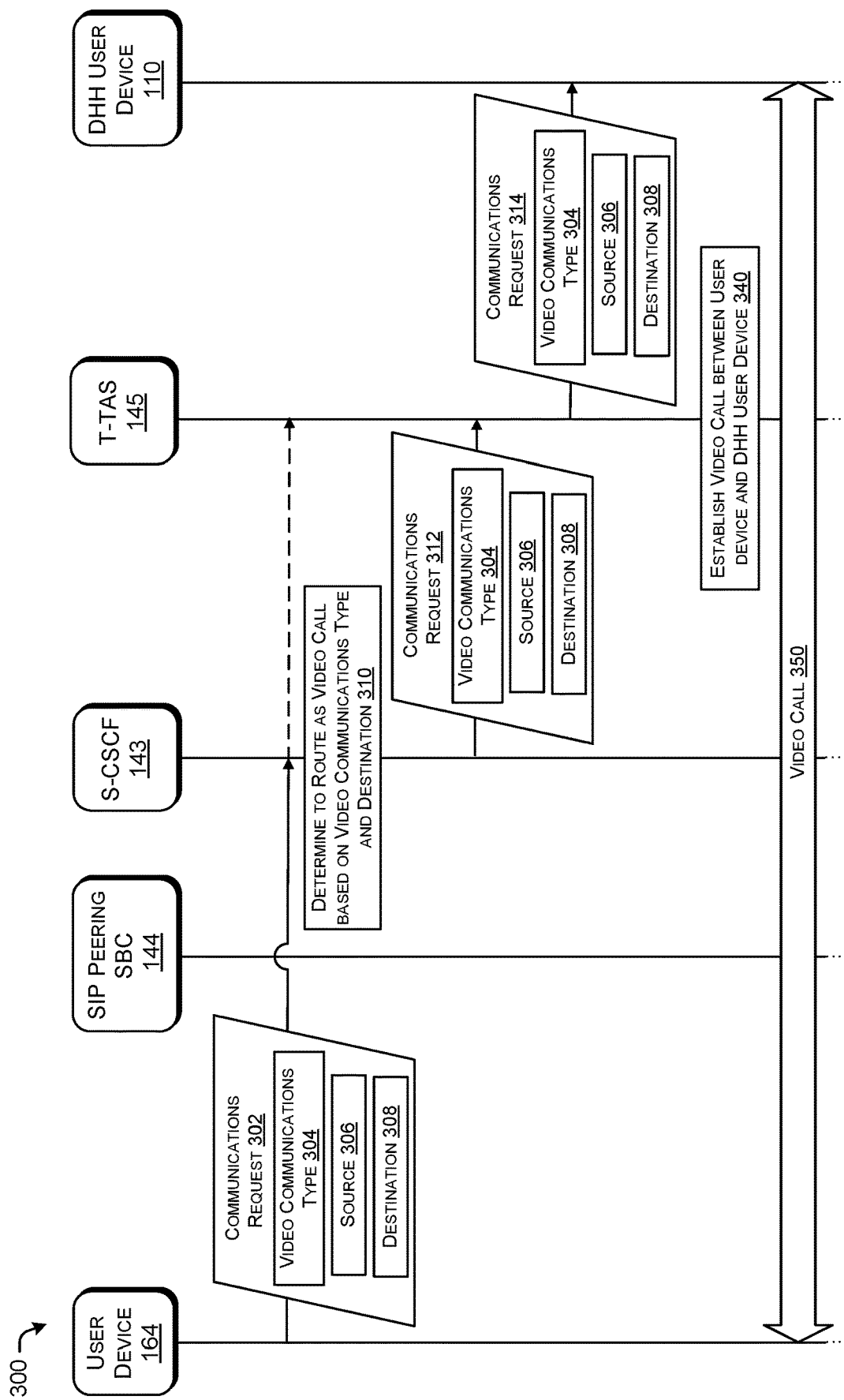
FIGS. 3A and 3B are diagrams of illustrative signal flows associated with systems and techniques for performing routing determinations, in accordance with examples of the disclosure.
Figure 3B:
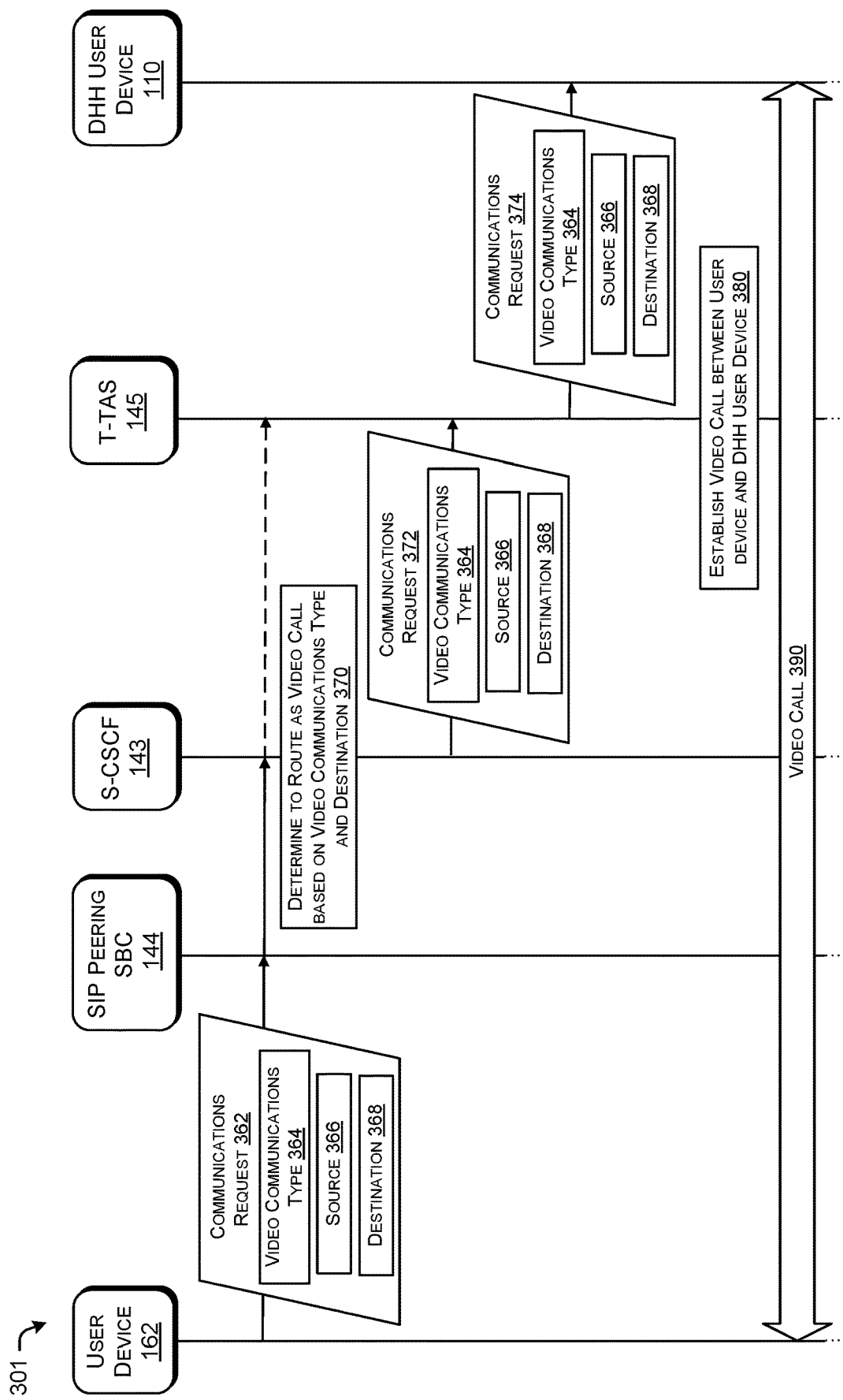

FIGS. 3A and 3B illustrates exemplary signal flows 300 and 301 of various messages that may be exchanged in one or more of the disclosed systems and techniques for performing routing determinations using single number communications data. Reference may be made in this description of the signal flows 300 and 301 to devices, entities, functions, components, and/or interfaces illustrated in FIG. 1 and described in regard to that figure. However, the operations, signals, and signal flow illustrated in FIGS. 3A and 3B and described herein may be implemented in any suitable system and/or with any one or more suitable devices and/or entities. Moreover, any of the operations, signals, and/or entities described in regard to FIGS. 3A and 3B may be used separately and/or in conjunction with other operations, signals, and/or entities. All such embodiments are contemplated as within the scope of the instant disclosure.

Signal flow 300 of FIG. 3A illustrates an example of signals that may be exchanged and operations that may be performed based on a user device operating on the same wireless communications network as a DHH user device and requesting the establishment of a video call between the user device and a DHH user device according to systems and techniques disclosed herein. In this example, user device 164 may transmit a communications request 302 to a wireless communications network where it may be received at the S-CSCF 143. In various examples, where the communications request 302 is transmitted by a user device (e.g., user device 164) that is operating on the same network on which the S-CSCF 143 is configured, the communications request 302 may be received substantially directly at the S-CSCF 143 (e.g., without traversing a session border controller such as the SBC 142).

The communications request 302 may be any type of communications request, including a request to establish a packet-based and/or MMTel video communications session. The communications request 302 may include a video communications type 304 indicating that the communications request 302 is requesting the establishment of a video communications session. The communications request 302 may further include an indication of a source 306, which may be an identifier for the user device 164, such as a telephone number, IMSI, MSISDN, network address, etc. The communications request 302 may further include an indication of a destination 308, which may be an identifier for a device associated with a DHH user, such as the DHH user device 110. The destination identifier may also be an identifier such as a telephone number, IMSI, MSISDN, network address, etc. In various examples, the communications request 302 may be a SIP INVITE.

The S-CSCF 143, at operation 310 and based on the request 302, may determine that the request 302 is a request for a video call and is associated with an entry in single number communications data indicating that an assistance system is to be used for the requested voice call. For example, the entry in the single number communications data may indicate that voice calls associated with the destination 308 and/or the DHH user device 110 are to be routed to a VRS system 120, but may not indicate particular routing rules or instructions for video calls. Alternatively, the entry in the single number communications data may indicate that video calls (e.g., of any type, packet-based, MMTel, etc.) associated with the destination 308 and/or the DHH user device 110 are to be routed to the destination 308 and/or the DHH user device 110. In particular examples, iFC data in the single number communications data may indicate that MMTel voice calls or MMTel calls that are not video calls associated with the destination 308 are to be routed to the VRS system 120 and/or that MMTel video calls or video calls of one or more (e.g., any) other types associated with the destination 308 are to be routed to the destination 308 and/to its associated device. In various examples, the single number communications data used to make this determination may be iFC data stored at the S-CSCF 143. In various examples, the single number communications data used to make this determination may be iFC data stored at the S-CSCF 143. In examples, the S-CSCF 143 may download or otherwise obtain such iFC data from an HSS (e.g., HSS 147) and/or from one or more other systems or components and use such data to evaluate requests as described herein.

In response to determining that the requested video call is to be established (e.g., directly) between the user device 164 and the DHH user device 110 (e.g., without the involvement of a VRS system), the S-CSCF 143 may transmit a communications request 312 to the T-TAS 145 for the establishment of the video call. The communications request 312 may include an indication of the source 306 associated with the user device 164, the destination 308 associated with the DHH user device 110, and/or an indication of the video communications type 304. In various embodiments, the communications request 312 may be a SIP INVITE message similar to the communications request 302 instructing or causing the T-TAC 145 to initiate a video call between the user device 164 and the DHH user device 110.

In various examples, the communications request 302 may alternatively or additionally be transmitted to the T-TAS 145. In such examples, the operation 310 may instead, or also, be performed by the T-TAS 145. For example, the S-CSCF 143 may relay this request 302 (e.g., directly or via one or more other components) to the T-TAS 145. In such examples, the T-TAS 145 may determine that the request 302 is a request for a video call and is associated with an entry in single number communications data indicating that an assistance system is to be used for the requested voice call. In such examples, the T-TAS 145 may store or otherwise have access to such single number communications data. Here again, such single number communications data may indicate that voice calls associated with the destination 308 and/or the DHH user device 110 are to be routed to a VRS system 120, but may not indicate particular routing rules or instructions for video calls. Alternatively, such data may indicate that video calls (e.g., of any type, packet-based, MMTel, etc.) associated with the destination 308 and/or the DHH user device 110 are to be routed to the destination 308 and/or the DHH user device 110. As described herein, such data may be represented as iFC data. In examples, the T-TAC 145 may be executing at or in conjunction with the S-CSCF 143, or as a distinct component or function. In examples, the T-TAC 145 may download or otherwise obtain such iFC data from an HSS (e.g., HSS 147) and/or from one or more other systems or components and use such data to evaluate requests as described herein.

In response to receiving the communications request 312 and/or in response to otherwise determining to establish a video communications session between the user device 164 and the DHH user device 110, the T-TAS 145 may transmit a communications request 314 to the DHH user device 110 that includes the video communications type 304 indication and/or related data, the source 306, and the destination 308.

At operation 340, the T-TAS 145 may establish, or facilitate the establishment of, a video communications session (e.g., video call 350) between the DHH user device 110 and the user device 164 (e.g., communicatively connecting their respective devices). The DHH user device 110 and the user device 164 may then communicate via the video call 350.

Signal flow 301 of FIG. 3B illustrates an example of signals that may be exchanged and operations that may be performed based on a user device operating on a different wireless communications network than a DHH user device and requesting the establishment of a video call between the user device and a DHH user device according to systems and techniques disclosed herein. In this example, because the user device 162 operates on a different network than the network on which the S-CSCF 143 is configured, the user device 162 may transmit a communications request 362 via its wireless communications network to the SIP Peering SBC 144, which may relay the request 362 to the S-CSCF 143 and/or otherwise transmit data representative of the request 362 to the S-CSCF 143.

The communications request 362 may be any type of communications request, including a request to establish a packet-based and/or MMTel video communications session. The communications request 362 may include a video communications type 364 indicating that the communications request 362 is requesting the establishment of a video communications session. The communications request 362 may further include an indication of a source 366, which may be an identifier for the user device 162, such as a telephone number, IMSI, MSISDN, network address, etc. The communications request 362 may further include an indication of a destination 368, which may be an identifier for a device associated with a DHH user, such as the DHH user device 110. The destination identifier may also be an identifier such as a telephone number, IMSI, MSISDN, network address, etc. In various examples, the communications request 362 may be a SIP INVITE.

The S-CSCF 143, at operation 370 and based on the request 362, may determine that the request 362 is a request for a video call and is associated with an entry in single number communications data indicating that an assistance system is to be used for the requested voice call. For example, the entry in the single number communications data may indicate that voice calls associated with the destination 368 and/or the DHH user device 110 are to be routed to a VRS system 120, but may not indicate particular routing rules or instructions for video calls. Alternatively, the entry in the single number communications data may indicate that video calls (e.g., of any type, packet-based, MMTel, etc.) associated with the destination 368 and/or the DHH user device 110 are to be routed to the destination 368 and/or the DHH user device 110. In particular examples, iFC data in the single number communications data may indicate that MMTel voice calls or MMTel calls that are not video calls associated with the destination 368 are to be routed to the VRS system 120 and/or that MMTel video calls or video calls of one or more (e.g., any) other types associated with the destination 368 are to be routed to the destination 368 and/to its associated device. In various examples, the single number communications data used to make this determination may be iFC data stored at the S-CSCF 143. In various examples, the single number communications data used to make this determination may be iFC data stored at the S-CSCF 143. In examples, the S-CSCF 143 may download or otherwise obtain such iFC data from an HSS (e.g., HSS 147) and/or from one or more other systems or components and use such data to evaluate requests as described herein.

In response to determining that the requested video call is to be established (e.g., directly) between the user device 162 and the DHH user device 110 (e.g., without the involvement of a VRS system), the S-CSCF 143 may transmit a communications request 372 to the T-TAS 145 for the establishment of the video call. The communications request 372 may include an indication of the source 366 associated with the user device 162, the destination 368 associated with the DHH user device 110, and/or an indication of the video communications type 364. In various embodiments, the communications request 372 may be a SIP INVITE message similar to the communications request 362 instructing or causing the T-TAC 145 to initiate a video call between the user device 162 and the DHH user device 110.

In various examples, the communications request 362 may alternatively or additionally be transmitted to the T-TAS 145. In such examples, the operation 370 may instead, or also, be performed by the T-TAS 145. For example, the S-CSCF 143 may relay the request 362 (e.g., directly or via one or more other components) to the T-TAS 145. In such examples, the T-TAS 145 may determine that the request 362 is a request for a video call and is associated with an entry in single number communications data indicating that an assistance system is to be used for the requested voice call. In such examples, the T-TAS 145 may store or otherwise have access to such single number communications data. Here again, such single number communications data may indicate that voice calls associated with the destination 368 and/or the DHH user device 110 are to be routed to a VRS system 120, but may not indicate particular routing rules or instructions for video calls. Alternatively, such data may indicate that video calls (e.g., of any type, packet-based, MMTel, etc.) associated with the destination 368 and/or the DHH user device 110 are to be routed to the destination 368 and/or the DHH user device 110. As described herein, such data may be represented as iFC data. In examples, the T-TAC 145 may be executing at or in conjunction with the S-CSCF 143, or as a distinct component or function. In examples, the T-TAC 145 may download or otherwise obtain such iFC data from an HSS (e.g., HSS 147) and/or from one or more other systems or components and use such data to evaluate requests as described herein.

In response to receiving the communications request 372 and/or in response to otherwise determining to establish a video communications session between the user device 162 and the DHH user device 110, the T-TAS 145 may transmit a communications request 374 to the DHH user device 110 that includes the video communications type 364 indication and/or related data, the source 366, and the destination 368.

At operation 380, the T-TAS 145 may establish, or facilitate the establishment of, a video communications session (e.g., video call 390) between the DHH user device 110 and the user device 162 (e.g., communicatively connecting their respective devices). The DHH user device 110 and the user device 162 may then communicate via the video call 390.

Illustrative Functions and Communications

Figure 5:
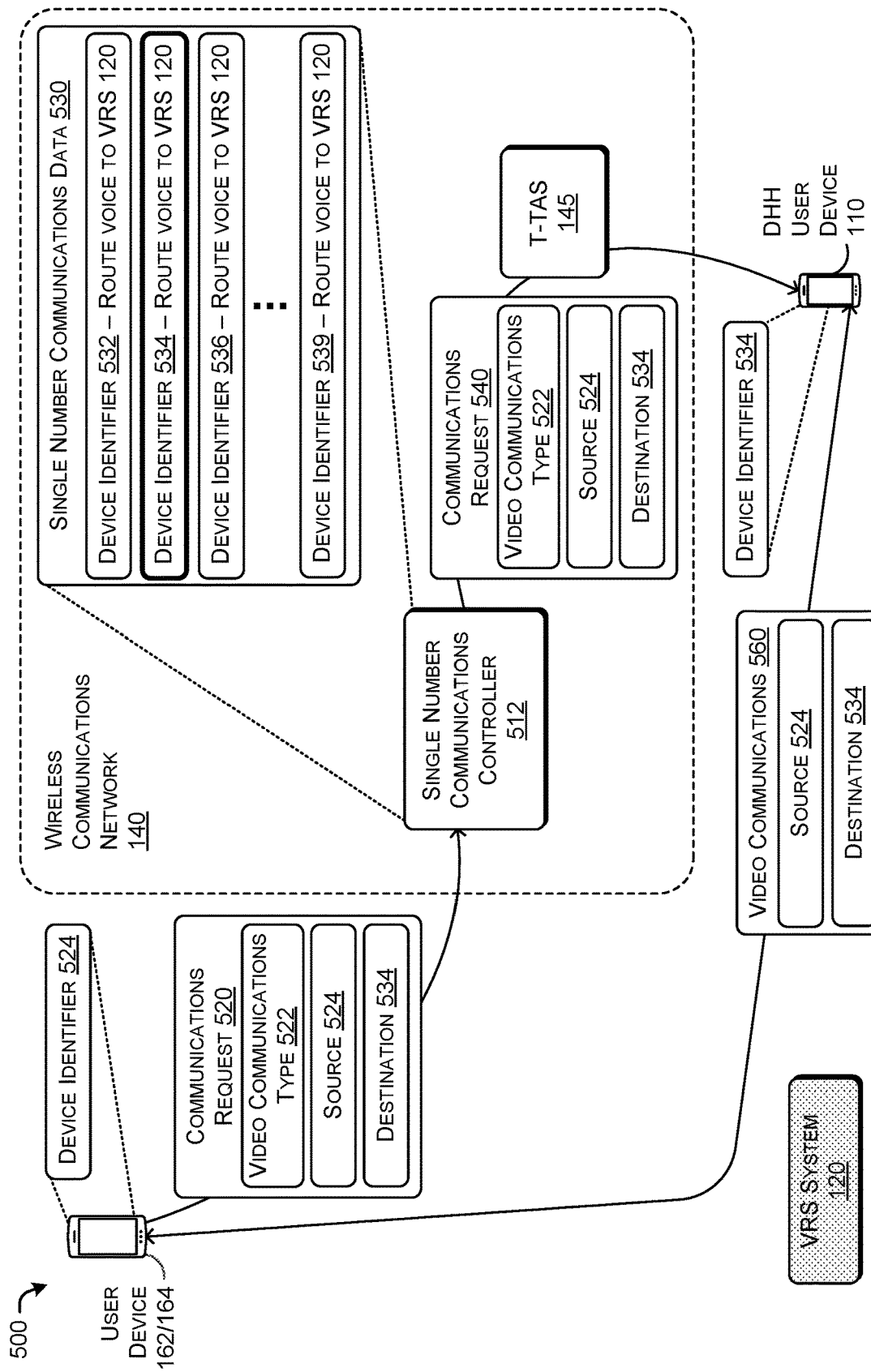
FIG. 5 is a schematic diagram of illustrative functions and communications that may be implemented in a wireless communications network in which systems and methods for performing routing determinations may be implemented, in accordance with examples of the disclosure.

FIGS. 4 and 5 illustrate schematic diagrams of exemplary functions and communications of various messages that may be exchanged in one or more of the disclosed systems and techniques for performing routing determinations using single number communications data as described herein. Reference may be made in this description of the exemplary functions and communications to devices, messages, functions, components, and/or operations illustrated in FIG. 1 and described in regard to that figure. However, the functions and communications illustrated in FIGS. 4 and 5 and described herein may be implemented in any suitable system and/or with any one or more suitable devices and/or entities. Moreover, any of the functions and communications described in regard to FIGS. 4 and 5 may be used separately and/or in conjunction with other functions and communications and/or implemented using any one or more devices, systems, operations, and any combination thereof. All such embodiments are contemplated as within the scope of the instant disclosure.

FIG. 4 illustrates a schematic diagram 400 that may represent a subset of the functions and components represented in environment 100 of FIG. 1. In this example, a request for a voice communications or call may be processed. The wireless communications network 140 may include a single number communications controller 412. The single number communications controller 412 may be configured as a dedicated component and/or function in the wireless communications network 140. Alternatively, the single number communications controller 412 may be configured at an SBC, CSCF (e.g., S-CSCF), and/or as a function and/or component of any other one or more other network components (e.g., as one or any combination of SBC 142, S-CSCF 143, T-TAS 145, and HSS 147). The DHH user device 110 may be in communication with the wireless communications network 140 and, in particular, with the single number communications controller 412 (e.g., via a base station and/or one or more other network components). The VRS system 120 may also, or instead, be in communication with the wireless communications network 140 and, in particular, with the single number communications controller 412 (e.g., via a SIP trunk, a data connection (e.g., facilitating data exchange using an API at the VRS system 120), and/or one or more other network components). The user device 162/164 may also, or instead, be in communication with the wireless communications network 140 directly or indirectly (e.g., via the VRS system 120 during an assisted call).

The single number communications controller 412 may be configured with and/or have access to single number communications data 430. In various examples, the single number communications data 430 may be, or include, one or more data structures that may be used by the single number communications controller 412 to determine single number communications operations. For instance, the single number communications data 430 may represent one or more entries indicating particular devices and/or device identifiers, such as numbers (e.g., telephone numbers, IMSIs, MSISDNs, etc.), addresses (e.g., network addresses, IP addresses, etc.), particular users and/or user identifiers, and/or other identifying information for entities that may be associated with assisted communications and/or other types of communications. Data represented in the single number communications data 430 may include routing data for such entities represented in the data and conditions under which such routing data is to be applied. For example, an entry in the single number communications data 430 may include a telephone number, a condition associated with a communications type, and routing instructions that are to be applied when a communications request associated with the telephone number for the indicated communications type is detected.

In particular examples, the single number communications data 430 may include iFC data that may be used to associate particular devices, numbers, etc. with assisted communications, other types of communications, and/or routing data for various types of communications associated with such particular devices, numbers, etc. In various examples, such iFC data may be generated and stored at an HSS (e.g., HSS 147) and may be loaded onto the single number communications controller 412 (e.g., onto the S-CSCF 143 during CSCF registration where, for example, the single number communications controller 412 includes the S-CSCF 143). Such iFC data may otherwise be accessible to and/or configured at the single number communications controller 412 (e.g., by a CSCF function configured at or in communication with the single number communications controller 412).

In examples, the single number communications data 430 may include any number of entries, such as the illustrated entries associated with device identifiers 432-439. Individual such entries may include an indication of an entity (e.g., device, number, identifier, address, etc.), one or more conditions and/or parameters, and routing data. Such parameters may include an indication of an assistance service or system, such as a VRS system. Such parameters may also, or instead, include an indication of a communications type (e.g., video, voice, text, etc.) and/or means (e.g., packet-based communications, MMTel communications, etc.). Alternatively or additionally, individual entries represented in the single number communications data 430 may be associated with a default assistance service or system and/or a default routing configuration or process that may not be represented in the individual entries.

In examples, data in the single number communications data 430 may be added, removed, and/or modified by a DHH user and/or a VRS system. For example, the user of the DHH user device 110 may request a single number communications routing configuration for voice calls to the DHH user device 110 identifier 434. Alternatively or additionally, an operator of the VRS system 120 may request a single number communications routing configuration for voice calls to the DHH user device 110 identifier 434 (e.g., where the DHH user has interacted with the VRS system 120 separately to configure the VRS system 120 to assist with voice communications for the DHH user device 110). Such a configuration request may be provided to an operator of the wireless communications network 140 and/or the single number communications controller 412 via data generated by an application with which the DHH user and/or the operator of the VRS system 120 interacts. For example, a graphical user interface may be presented to the DHH user and/or the VRS system operator that, in response to activation of one or more controls by the user and/or operator, causes an underlying application to generate a configuration request with data that may then be used by the single number communications controller 412 and/or an associated device (e.g., HSS 147) to add, modify, or remove data in the single number communications data 430. The user device 162/164 may transmit a communications request 420 to the wireless communications network 140 where it may be received at the single number communications controller 412. The communications request 420 may be any type of communications request, including a request to establish a packet-based voice communications session. The communications request 420 may include a voice communications type 422 indicating that the communications request 420 is requesting the establishment of a voice communications session. The communications request 420 may further include an indication of a source 424, which may be the device identifier 424 for the user device 162/164. The communications request 420 may further include an indication of a destination 434, which may be a device identifier 434 for the DHH user device 110. In various examples, the communications request 420 may be a SIP INVITE message.

The single number communications controller 412 may evaluate the communications request 420 to determine the appropriate operations. In examples, the single number communications controller 412 may determine a communications type associated with the request 420. In the illustrated example, the single number communications controller 412 may determine, based on the voice communications type 422, that the communications request 420 is a request for a voice call. In various examples, the single number communications controller 412 may determine, based on the voice communications type 422, a particular type of voice communications indicated in the request 420, such as MMTel voice communications. Based on this determination, the single number communications controller 412 may determine whether the destination 434 is represented in the single number communications data 430. If not, the single number communications controller 412 may process the request 420 based on normally applicable voice call establishment operations. In the illustrated example, the single number communications controller 412 may identify the entry in the single number communications data 430 associated with the device identifier/destination 434. Based on this entry, the single number communications controller 412 may determine that voice calls associated with the device identifier/destination 434 are to be routed to a VRS system 120.

Based on determining that voice calls associated with the device identifier/destination 434 are to be routed to a VRS system 120, the single number communications controller 412 may transmit a voice communications request 440 to the VRS system 120. The voice communications request 440 may also include the source 424 and the destination 434 associated with the user device 162/164 and the DHH user device 110, respectively. In various examples, the voice communications request 440 may be a SIP INVITE.

In response to this voice communications request 440, the VRS system 120 may establish a voice communications session 460 between an interpreter at the VRS system 120 (e.g., an interpreter's device), the DHH user device 110, and the user device 162/164. As noted, such a session may be a video session or may be a video and audio data session allowing the DHH user to view the interpreter at the VRS system 120 and, in some examples the hearing user associated with the user device 162/164.

FIG. 5 illustrates a schematic diagram 500 that may represent a subset of the functions and components represented in environment 100 of FIG. 1. In this example, a video communications request may be processed. The wireless communications network 140 may include a single number communications controller 512. Similar to the controller 412 of FIG. 4, the single number communications controller 512 may be configured as a dedicated component and/or function in the wireless communications network 140. Alternatively, the single number communications controller 512 may be configured at an SBC, CSCF, and/or as a function and/or component of any other one or more other network components (e.g., as one or any combination of SBC 142, S-CSCF 143, T-TAS 145, and HSS 147). The DHH user device 110 may be in communication with the wireless communications network 140 and, in particular, with the single number communications controller 412 (e.g., via a base station and/or one or more other network components). The VRS system 120 may also, or instead, be in communication with the wireless communications network 140 and, in particular, with the single number communications controller 512 (e.g., via a SIP trunk, a data connection (e.g., facilitating data exchange using an API at the VRS system 120), and/or one or more other network components). The user device 162/164 may also, or instead, be in communication with the wireless communications network 140 directly or indirectly (e.g., via the VRS system 120 during an assisted call).

The single number communications controller 512 may be configured with and/or have access to single number communications data 530. In various examples, the single number communications data 530 may be, or include, one or more data structures that may be used by the single number communications controller 512 to determine single number communications operations. For instance, the single number communications data 530 may represent one or more entries indicating particular devices and/or device identifiers, such as numbers (e.g., telephone numbers, IMSIs, MSISDNs, etc.), addresses (e.g., network addresses, IP addresses, etc.), particular users and/or user identifiers, and/or other identifying information for entities that may be associated with assisted communications and/or other types of communications. Data represented in the single number communications data 530 may include routing data for such entities represented in the data and conditions under which such routing data is to be applied. For example, an entry in the single number communications data 530 may include a telephone number, a condition associated with a communications type, and routing instructions that are to be applied when a communications request associated with the telephone number for the indicated communications type is detected.

In particular examples, the single number communications data 530 may include iFC data that may be used to associate particular devices, numbers, etc. with assisted communications, other types of communications, and/or routing data for various types of communications associated with such particular devices, numbers, etc. In various examples, such iFC data may be generated and stored at an HSS (e.g., HSS 147) and may be loaded onto the single number communications controller 512 (e.g., onto the S-CSCF 143 during CSCF registration where, for example, the single number communications controller 412 includes the S-CSCF 143). Such iFC data may otherwise be accessible to and/or configured at the single number communications controller 512 (e.g., by a CSCF function configured at or in communication with the single number communications controller 512).

In examples, the single number communications data 530 may include any number of entries, such as the illustrated entries associated with device identifiers 532-539. Individual such entries may include an indication of an entity (e.g., device, number, identifier, address, etc.), one or more conditions and/or parameters, and routing data. Such parameters may include an indication of an assistance service or system, such as a VRS system. Such parameters may also, or instead, include an indication of a communications type (e.g., video, voice, text, etc.) and/or means (e.g., packet-based communications, MMTel communications, etc.). Alternatively or additionally, individual entries represented in the single number communications data 530 may be associated with a default assistance service or system and/or a default routing configuration or process that may not be represented in the individual entries.

In examples, data in the single number communications data 530 may be added, removed, and/or modified by a DHH user and/or a VRS system as described above in regard to FIG. 4 and the single number communications data 430.

The user device 162/164 may transmit a communications request 520 to the wireless communications network 140 where it may be received at the single number communications controller 512. The communications request 520 may be any type of communications request, including a request to establish a video communications session. The communications request 520 may include a video communications type 522 indicating that the communications request 520 is requesting the establishment of a video communications session. The communications request 520 may further include an indication of a source 524, which may be the device identifier 524 for the user device 162/164. The communications request 520 may further include an indication of a destination 534, which may be a device identifier 534 for the DHH user device 110. In various examples, the communications request 520 may be a SIP INVITE message.

The single number communications controller 512 may evaluate the communications request 520 to determine the appropriate operations. In examples, the single number communications controller 512 may determine a communications type associated with the request 520. In the illustrated example, the single number communications controller 512 may determine, based on the video communications type 522, that the communications request 520 is a request for a video call. In various examples, the single number communications controller 412 may determine, based on the video communications type 522, a particular type of voice communications indicated in the request 520, such as MMTel video communications. Based on this determination, the single number communications controller 512 may determine whether the destination 534 is represented in the single number communications data 530. If so, the single number communications controller 512 may determine if conditions and/or parameters in data associated with the destination 534 in the single number communications data 530 match or otherwise correspond to data associated with the communications request 520. For example, the single number communications controller 512 may determine if an entry of the destination 534 in the single number communications data 530 indicated the type of communications (e.g., video or MMTel video) indicated in the communications request 520.

If not, the single number communications controller 412 may process the request 520 based on normally applicable call establishment operations. In the illustrated example, the single number communications controller 512 may identify the entry in the single number communications data 530 associated with the device identifier/destination 534. Based on this entry, the single number communications controller 512 may determine that no routing instructions are included in the single number communications data 530 for video calls associated with the device identifier/destination 534. Therefore, the single number communications controller 512 may route, or facilitate routing of, the request 520 as a normal or standard video call, or otherwise as a call request that is not routed to an assistance system.

Based on determining that the video call request by the communications request 520 and associated with the device identifier/destination 434 is to be routed as a standard video call (or otherwise not to be routed to an assistance system), the single number communications controller 512 may transmit a communications request 540 to the T-TAS 145 for establishment of the video call. The communications request 540 may also include the source 524 and the destination 534 associated with the user device 162/164 and the DHH user device 110, respectively. In various examples, the communications request 540 may be a SIP INVITE.

In response to this communications request 540, the T-TAS 145 may establish a video communications session 560 between the source 524 (e.g., the user device 162/164) and the destination 534 (e.g., the DHH user device 110). In particular examples, the video communications session 560 may be a packet-based video session and/or an MMTel video session.

Illustrative Operations

Figure 6:
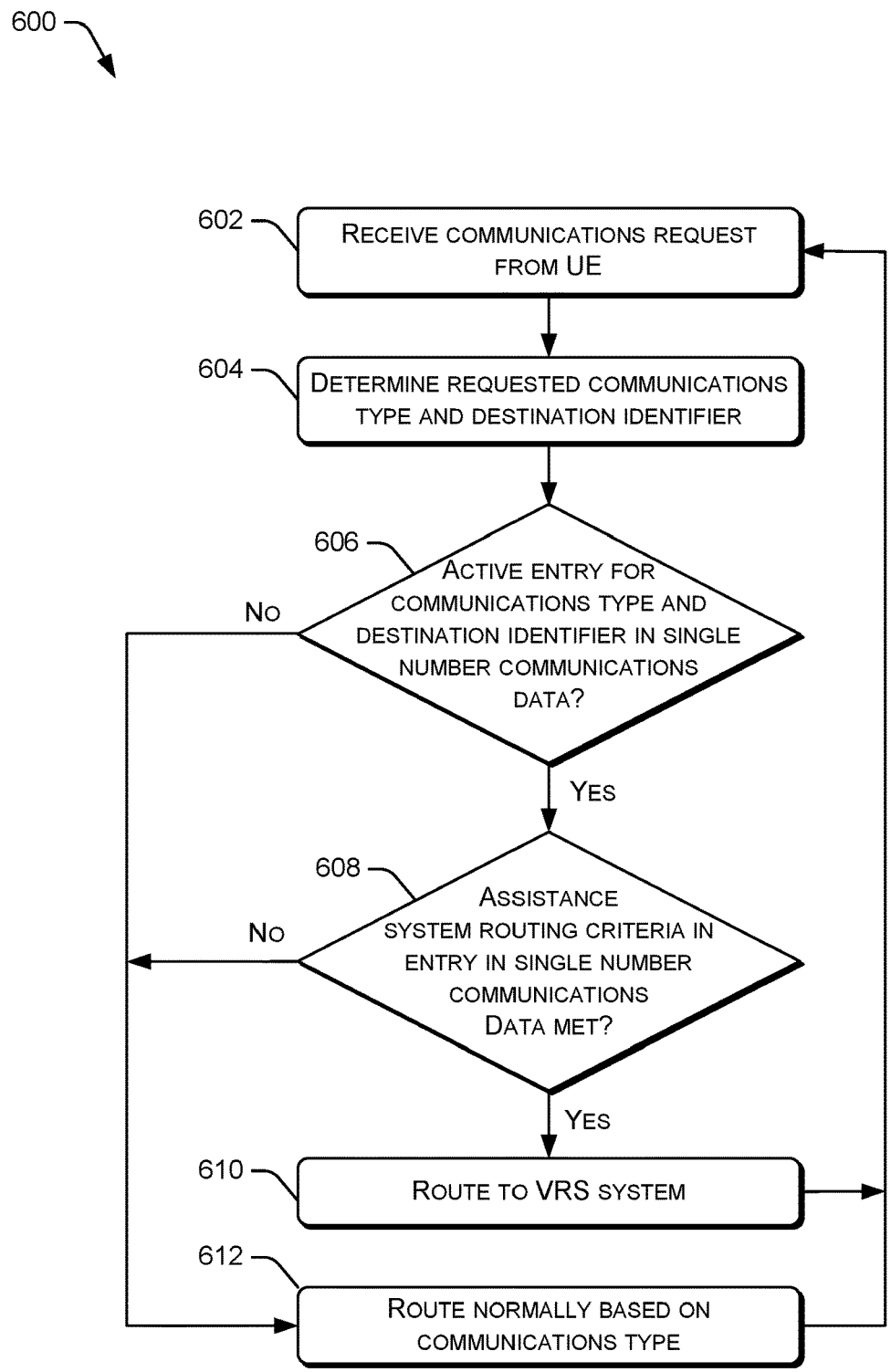
FIG. 6 is a flow diagram of an illustrative process for processing a communications request and performing routing determinations, in accordance with examples of the disclosure.

FIG. 6 shows a flow diagram of an illustrative process 600 for performing routing determinations based on single number communications data according to the disclosed embodiments. The process 600 is illustrated as a collection of blocks in a logical flow diagram, which represents a sequence of operations that can be implemented in software and executed in hardware. In the context of software, the blocks represent computer-executable instructions that, when executed by one or more processors, perform the recited operations.

Generally, computer-executable instructions include routines, programs, objects, components, data structures, and the like that perform functions and/or implement particular abstract data types. The order in which the operations are described is not intended to be construed as a limitation, and any number of the described blocks can be omitted and/or combined in any order and/or in parallel to implement the processes. For discussion purposes, the process 600 may be described with reference to the wireless network environment 100 of FIG. 1; however other environments may also be used.

At block 602, a communications request may be received from a UE at a single number communications system, for example, at a single number communications controller and/or one or more functions and/or components configured at such a system to perform single number communications operations as described herein (e.g., SBC, CSCF, S-CSCF, etc.). The received communications request may be any type of communications request, including a request to establish a voice or a video communications session. The communications request may indicate a source device (e.g., an identifier associated with a source device) and a destination device (e.g., an identifier associated with a destination device). In particular examples, the source device may be a user device of any type associated with a user the destination device may be a user device of any type associated with a DHH user.

At block 604, the system may determine the requested communications type and a destination identifier based on the communications request received at block 602. Using this information, at block 606, the system may determine whether there is an active (e.g., not suspended or disabled) entry corresponding to the communications type and destination identifier in single number communications data (e.g., iFC data). In examples, the system may determine whether to access such single number communications data based on the communications type. For instance, if the communications type is not voice (e.g., one or more particular types of voice-related communications associated with assistance routing), the system may determine that access to the single number communications data is unnecessary. On the other hand, if the communications type is voice (e.g., one or more of the particular types of voice-related communications associated with assistance routing), the system may determine to access the single number communications data to evaluate such data using the source identifier and, in some example, the communications type. Alternatively, the system may access the single number communications data based on the communications type for each communications request to determine whether there is routing and/or other data in single number communications data associated with the communications request (e.g., destination identifier and/or communications type requested).

If, at block 606, the system determines that there is an active entry corresponding to the communications type and/or destination identifier in the single number communications data (e.g., the destination identifier and/or the communications type indicated in the communications request are represented in the single number communications data), at block 608, the system may determine whether such an entry is associated with routing the communications request to a VRS system or other assistance system for completion of an assisted call establishment process (e.g., as described herein). If so, at block 610, the system may route the communications request to a VRS system or other assistance system. The process 600 may return to block 602 to process additional communications requests.

If, at block 606, the system determines that there is no active entry corresponding to the communications type and/or the destination identifier in the single number communications data (e.g., the destination identifier and/or the communications type indicated in the communications request are not represented in the single number communications data), at block 612, the system may route the communications request normally and/or otherwise process the request using standard processing operations and/or processing operations that are not otherwise associated with assistance routing. For example, if there is an entry in the single number communications data for the destination identifier and voice calls, but no entry in the single number communications data for the destination identifier and video calls, and the communications request is for the destination identifier and a video call, the system may route the request normally at block 612 because there was no correspondence of the destination identifier and a video call with an entry in the single number communications data. The process 600 may return to block 602 to process additional communications requests.

Figure 7:
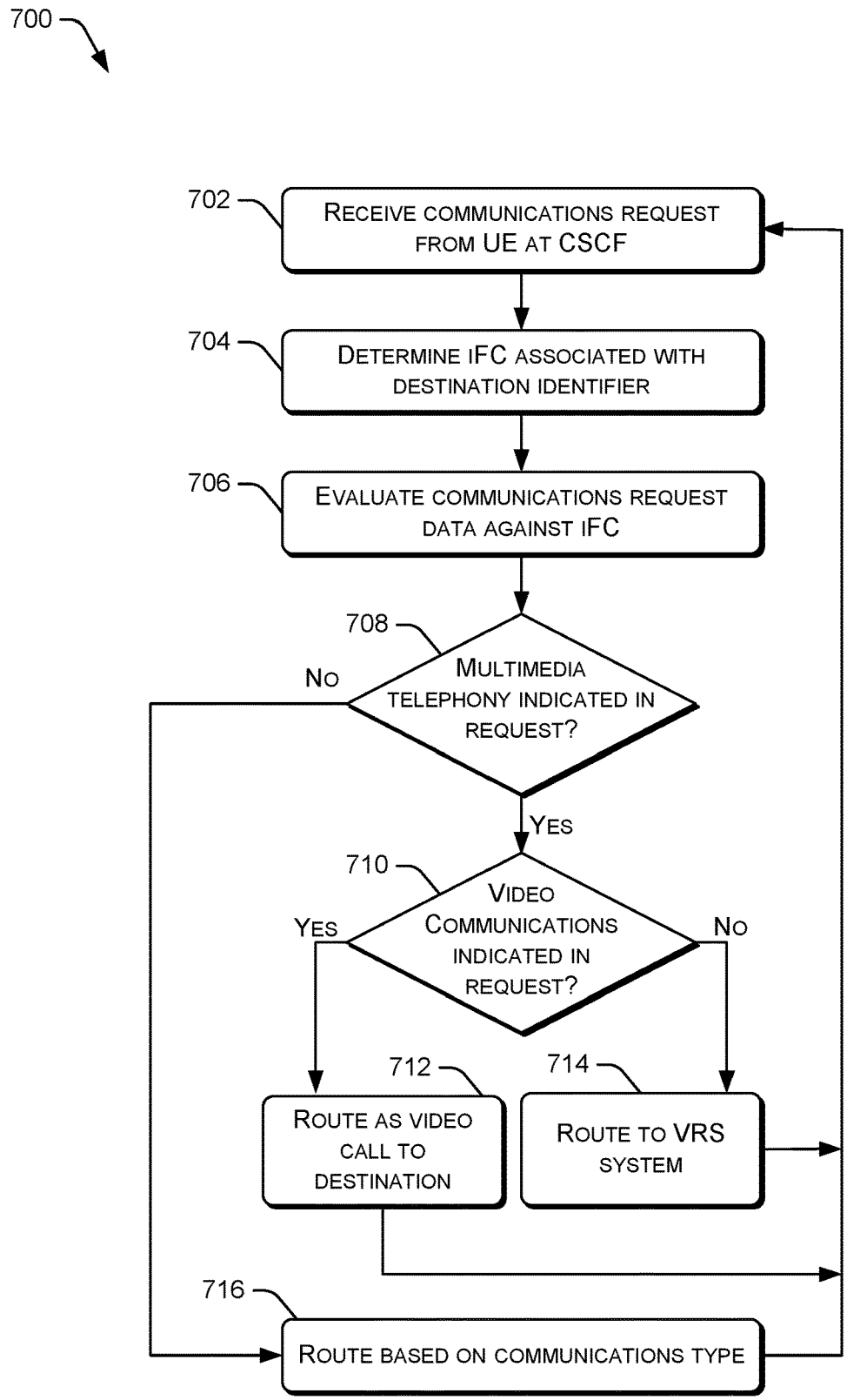
FIG. 7 is a flow diagram of an illustrative process for processing a communications request and performing routing determinations, in accordance with examples of the disclosure.

FIG. 7 shows a flow diagram of an illustrative process 700 for performing routing determinations based on single number communications data according to the disclosed embodiments. The process 700 is illustrated as a collection of blocks in a logical flow diagram, which represents a sequence of operations that can be implemented in software and executed in hardware. In the context of software, the blocks represent computer-executable instructions that, when executed by one or more processors, perform the recited operations.

Generally, computer-executable instructions include routines, programs, objects, components, data structures, and the like that perform functions and/or implement particular abstract data types. The order in which the operations are described is not intended to be construed as a limitation, and any number of the described blocks can be omitted and/or combined in any order and/or in parallel to implement the processes. For discussion purposes, the process 700 may be described with reference to the wireless network environment 100 of FIG. 1; however other environments may also be used.

At block 702, a communications request may be received from a UE at a CSCF (e.g., an S-CSCF) that may be configured to perform one or more of the routing determination operations described herein. The received communications request may be any type of communications request, including a request to establish a voice or a video communications session. The communications request may indicate a source device (e.g., an identifier associated with a source device) and a destination device (e.g., an identifier associated with a destination device). In particular examples, the source device may be a user device of any type associated with a user the destination device may be a user device of any type associated with a DHH user.

At block 704, the system may determine the requested communications type and a destination identifier based on the communications request received at block 702. Using this information, further at block 704, the CSCF may determine one or more iFCs that may be applicable to the communications request. Similar to the process 600 described above, the CSCF may determine whether to access iFC data based on various criteria or may access iFC data for every communications request to determine if there is iFC data that may be applicable to the request. In this example, at block 704, the CSCF may identify one or more potentially applicable iFCs based on the communications request received at block 702.

At block 706, the CSCF may evaluate communications request data against the one or more identified potentially applicable iFCs. For example, the CSCF may identify an iFC associated with the destination identifier represented in the communications request. The CSCF may then determine whether the communications type indicated in that iFC corresponds to the communications type represented in the iFC associated with the destination identifier. The CSCF may determine one or more correspondences (or lack thereof) of any type.

For example, the CSCF may identify an iFC that indicates that MMTel voice calls for a destination identifier are to be routed to an assistance system (e.g., VRS system). In this example, at block 708, the CSCF may determine whether the communications request received at block 702 is an MMTel communications request. If not (and if there is no other iFC associated with the destination identifier that corresponds to the communications request), at block 716, the CSCF may route the communications request normally, based on default routing data and/or the communications type, or otherwise not based on an assisted call iFC. The process 700 may return to block 702 to process additional communications requests.

If, at block 708, the CSCF determines that the communications request received at block 702 is an MMTel communications request, at block 710, the CSCF may determine whether the communications request is for a video call. If so, because the iFC for the destination identifier specifies MMTel voice calls and the communications request is for an MMTel video call (and because there may be no iFC for the destination identifier specifying MMTel video calls), at block 712, the CSCF may route the communications request as a video call request. The process 700 may return to block 702 to process additional communications requests.

If, at block 710, the CSCF may determine that the communications request is not for an MMTel video call and/or that the communications request is for an MMTel voice call (e.g., because the iFC for the destination identifier specifies MMTel voice calls), at block 714, the CSCF may route the communications request to an assistance system (e.g., VRS system) for assisted call setup and execution. The process 700 may return to block 702 to process additional communications requests.

In a particular example, the CSCF may execute or evaluate a particular iFC against communications request data. For example, the communications request may be a SIP INVITE or other SIP MESSAGE. The SIP INVITE or MESSAGE may include an "Accept-Contact" header that may include one or more "tags" or representations of header data. In examples, an iFC associated with a particular destination identifier may specify the tags that must be present and/or absent in the Accept-Contact header for the routing data in that iFC to be applicable.

For example, a SIP INVITE or MESSAGE may include a tag in the Accept-Contact header that indicates an MMTel service request (e.g., with "3gpp-service.ims.icsi.mmtel" included within the tag). The Accept-Contact header may also, or instead, include a tag that indicates communications type, such as video (e.g., with "video" included within the tag). An iFC associated with a destination identifier included in the SIP INVITE or MESSAGE may indicate assistance system routing for MMTel service requests that are not video communications requests. In this example, a CSCF may determine if the SIP INVITE or MESSAGE is an MMTel service request (e.g., includes a tag with "3gpp-service.ims.icsi.mmtel" within the Accept-Contact header) and is not a video request (e.g., does not include a "video" within the same tag or another tag in the Accept-Contact header). Because the iFC may indicate that a SIP INVITE or MESSAGE that is an MMTel service request that is not for video is to be routed to be an assistance system, the CSCF may route such SIP INVITEs or MESSAGEs to the assistance system and otherwise route other SIP INVITEs or MESSAGEs normally or otherwise not to the assistance system. The particular assistance system may be represented in the iFC and/or may be a default system. Alternatively or additionally, the assistance system and/or related data may be accessed or determined by the CSCF using other means.

In summary, by more efficiently and conveniently implementing and/or determining routing operations without requiring the use of multiple telephone numbers, the disclosed systems and techniques may be able to increase the ease of usage of telecommunications systems for DHH user and increase the efficiency of network and user device operations, improving the user experience and performance of both the network and user devices.

Example User Equipment

Figure 8:
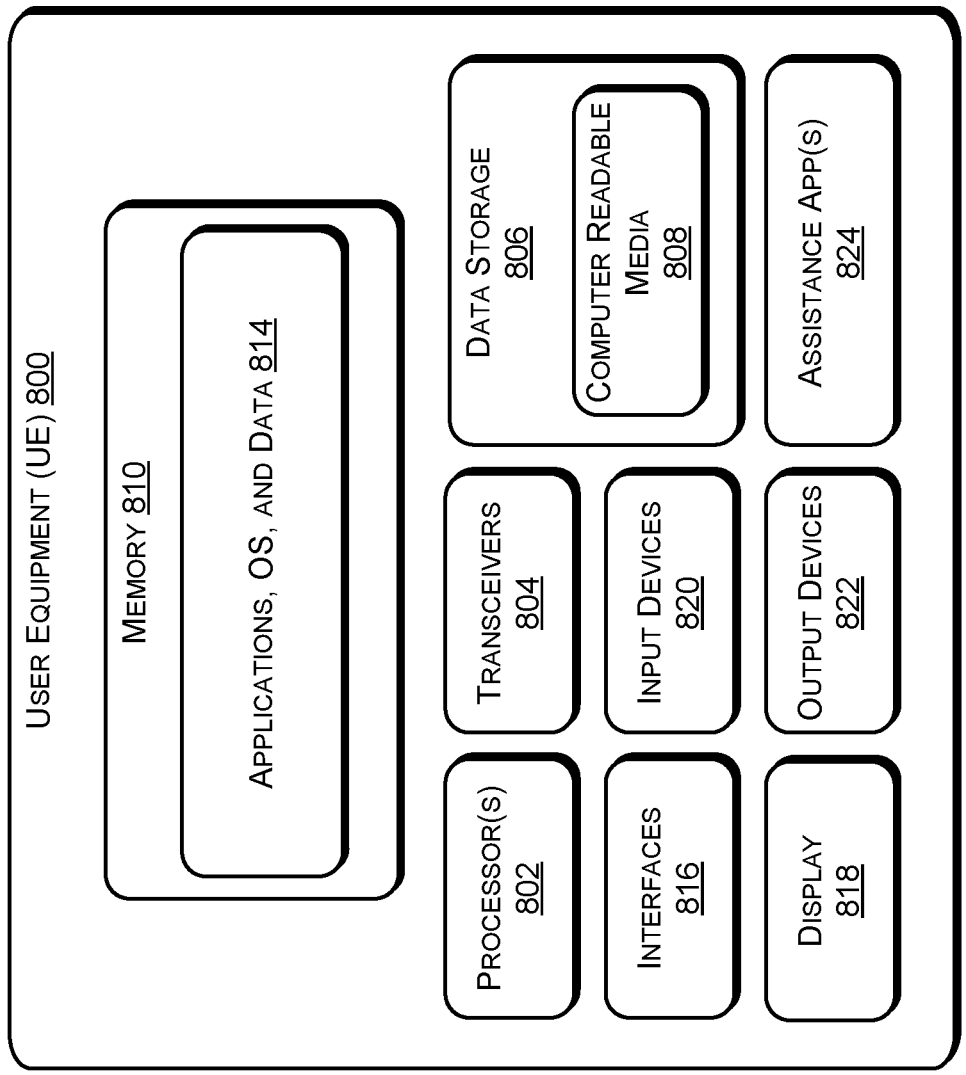
FIG. 8 is a schematic diagram of illustrative components in an example user device that may be configured for use in systems and methods configured for performing routing determinations, in accordance with examples of the disclosure.

FIG. 8 illustrates exemplary UE 800, which may be a UE such as DHH user device 110, user device 162, or user device 164, for use with the systems and methods disclosed herein, in accordance with some examples of the present disclosure. The UE 800 may include one or more processors 802, one or more transmit/receive antennas (e.g., transceivers or transceiver antennas) 804, and a data storage 806. The data storage 806 may include a computer readable media 808 in the form of memory and/or cache. This computer-readable media may include a non-transitory computer-readable media. The processor(s) 802 may be configured to execute instructions, which can be stored in the computer readable media 808 and/or in other computer readable media accessible to the processor(s) 802. In some configurations, the processor(s) 802 is a Central Processing Unit (CPU), a Graphics Processing Unit (GPU), or both CPU and GPU, or any other sort of processing unit. The transceiver antenna(s) 804 can exchange signals with a base station, such as base station 148.

The UE 800 may be configured with a memory 810. The memory 810 may be implemented within, or separate from, the data storage 806 and/or the computer readable media 808. The memory 810 may include any available physical media accessible by a computing device to implement the instructions stored thereon. For example, the memory 810 may include, but is not limited to, RAM, ROM, EEPROM, a SIM card, flash memory or other memory technology, CD-ROM, DVD or other optical disk storage, magnetic cassettes, magnetic tape, magnetic disk storage or other magnetic storage devices, or any other medium which may be used to store the desired information and which may be accessed by the UE 800.

The memory 810 can store several modules, such as instructions, data stores, and so forth that are configured to execute on the processor(s) 802. In configurations, the memory 810 may also store one or more applications 814 configured to receive and/or provide voice, data, and messages (e.g., SMS messages, Multi-Media Message Service (MMS) messages, Instant Messaging (IM) messages, Enhanced Message Service (EMS) messages, etc.) to and/or from another device or component (e.g., the base station 148). The applications 814 may also include one or more operating systems and/or one or more third-party applications that provide additional functionality to the UE 800.

Although not all illustrated in FIG. 8, the UE 800 may also comprise various other components, e.g., a battery, a charging unit, one or more network interfaces 816, an audio interface, a display 818, a keypad or keyboard, and one or more input devices 820, and one or more output devices 822. The UE 800 may further include one or more assistance apps 824 that may be configured to facilitate voice communications between the UE 800 and one or more assistance systems, such as the VRS system 120, as described herein for single number communications accessibility operations and components.

Example Computing Device

Figure 9:
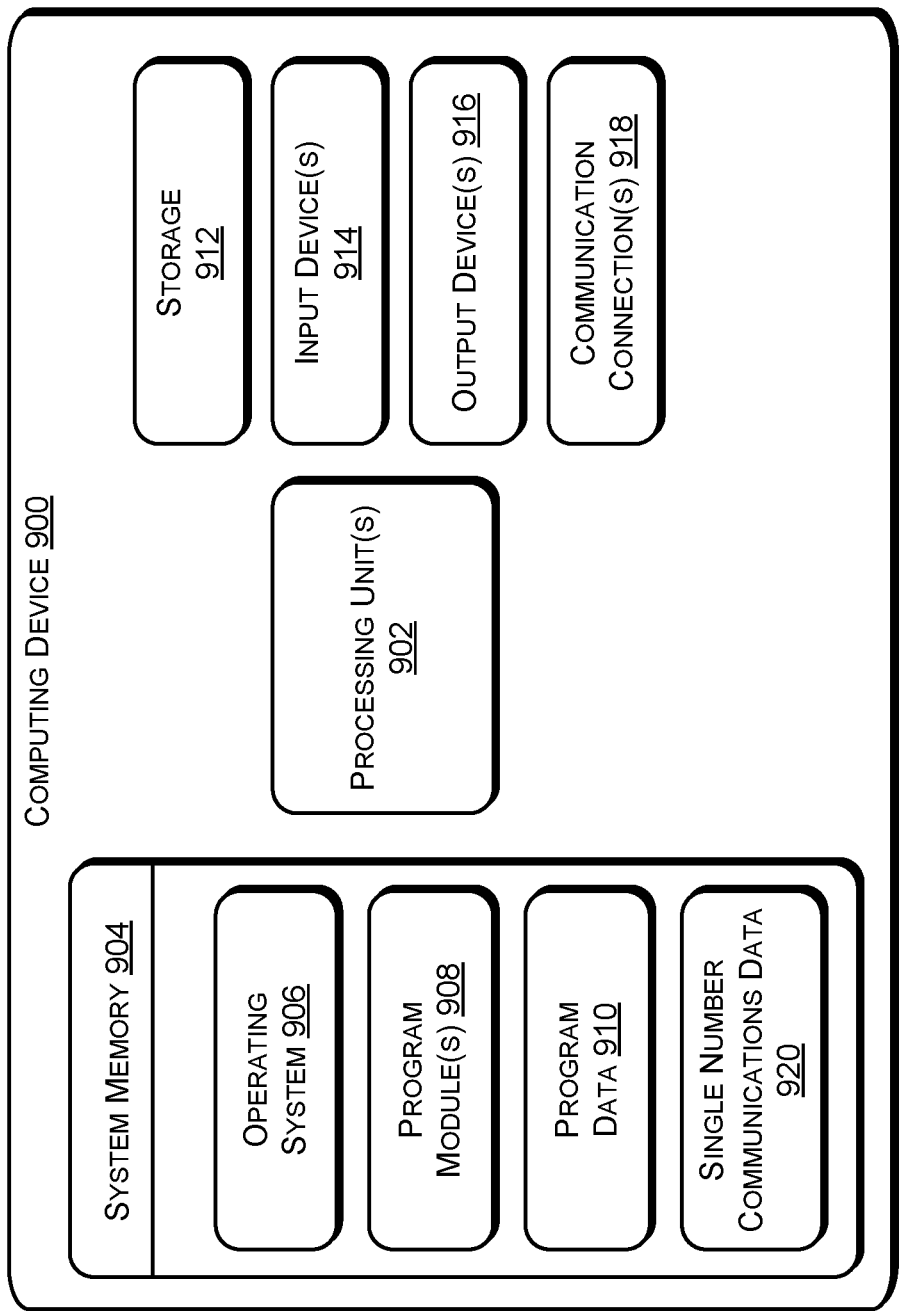
FIG. 9 is a schematic diagram of illustrative components in an example computing device that may be configured for performing routing determinations, in accordance with examples of the disclosure.

FIG. 9 is an example of a computing device 900 for use with the systems and methods disclosed herein, in accordance with some examples of the present disclosure. The computing device 900 can be used to implement various components of a core network, a base station, and/or any servers, routers, gateways, gateway elements, administrative components, etc. that can be used by a communication provider. One or more computing devices 900 can be used to implement the network 140, for example. One or more computing devices 900 can also be used to implement base stations and other components, such as the S-CSCF 143, the SBC 142, the T-TAS 145, and/or the HSS 147.

In various embodiments, the computing device 900 can include one or more processing units 902 and system memory 904. Depending on the exact configuration and type of computing device, the system memory 904 can be volatile (such as RAM), non-volatile (such as ROM, flash memory, etc.) or some combination of the two. The system memory 904 can include an operating system 906, one or more program modules 908, program data 910, and single number communications data 920. The system memory 904 may be secure storage or at least a portion of the system memory 904 can include secure storage. The secure storage can prevent unauthorized access to data stored in the secure storage. For example, data stored in the secure storage can be encrypted or accessed via a security key and/or password.

The computing device 900 can also include additional data storage devices (removable and/or non-removable) such as, for example, magnetic disks, optical disks, or tape. Such additional storage is illustrated in FIG. 9 by storage 912.

Non-transitory computer storage media of the computing device 900 can include volatile and nonvolatile, removable and non-removable media implemented in any method or technology for storage of information, such as computer readable instructions, data structures, program modules, or other data. The system memory 904 and storage 912 are examples of computer readable storage media. Non-transitory computer readable storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by computing device 900. Any such non-transitory computer readable storage media can be part of the computing device 900.

In various examples, any or all of the system memory 904 and storage 912 can store programming instructions which, when executed, implement some or all of the functionality described above as being implemented by one or more systems configured in the environment 100 and/or components of the network 140.

The computing device 900 can also have one or more input devices 914 such as a keyboard, a mouse, a touch-sensitive display, voice input device, etc. The computing device 900 can also have one or more output devices 916 such as a display, speakers, a printer, etc. can also be included. The computing device 900 can also contain one or more communication connections 918 that allow the device to communicate with other computing devices using wired and/or wireless communications.

Example Clauses The following paragraphs describe various examples. Any of the examples in this section may be used with any other of the examples in this section and/or any of the other examples or embodiments described herein.

A: A method comprising: receiving, from a source user equipment (UE) at a serving call session control function (S-CSCF) configured at a wireless communications network, a first request to establish a communications session between the source UE and a destination UE; determining, at the S-CSCF and based at least in part on the first request, a requested communications type and a device identifier associated with the destination UE; determining, at the S-CSCF and based at least in part on the device identifier and initial filter criteria (iFC) data, routing data associated with the destination UE; generating, based at least in part on the first request, a second request to establish the communications session between the source UE and the destination UE; transmitting, by the S-CSCF and based at least in part on the routing data, the second request to one of a video relay service (VRS) system or a terminating telephony application server (T-TAS); and establishing, via the wireless communications network and based at least in part on the second request, the communications session between the source UE and the destination UE.

B: The method of paragraph A, wherein receiving the first request comprises: receiving, from the source UE at a session border controller (SBC) configured at the wireless communications network, the first request; and transmitting the first request from the SBC to the S-CSCF.

C: The method of paragraph A or B, wherein determining the routing data associated with the destination UE comprises determining a subset of iFC data associated with the destination UE.

D: The method of any of paragraphs A-C, wherein determining the routing data is further based at least in part on the requested communications type.

E: The method of any of paragraphs A-E, wherein: the requested communications type comprises a voice communications type; and transmitting the second request comprises transmitting the second request to the VRS system based at least in part on the voice communications type.

F: The method of paragraph E, wherein: the requested communications type comprises a video communications type; and transmitting the second request comprises transmitting the second request to the T-TAS based at least in part on the video communications type.

G: A call session control function (CSCF) comprising: one or more processors; one or more transceivers; and non-transitory computer-readable media storing computer-executable instructions that, when executed by the one or more processors, cause the one or more processors to perform operations comprising: receiving a first request from a source user equipment (UE) to establish a communications session between the source UE and a destination UE; determining, based at least in part on the first request, a requested communications type and a device identifier associated with the destination UE; determining, based at least in part on the device identifier and filter criteria data, routing data associated with the destination UE; generating, based at least in part on the first request, a second request to establish the communications session between the source UE and the destination UE; transmitting, based at least in part on the routing data, the second request to one of an assisted voice communications system or a video communications system; and establishing, based at least in part on the second request, the communications session between the source UE and the destination UE.

H: The CSCF of paragraph G, wherein determining the routing data comprises: determining that no data of the filter criteria data is associated with the destination UE; and based at least in part on determining that no data of the filter criteria data is associated with the destination UE, determining default routing data as the routing data.

I: The CSCF of paragraph G or H, wherein determining the routing data comprises: determining a subset of the filter criteria data associated with the destination UE; and determining that the subset of the filter criteria data does not correspond to the requested communications type; and based at least in part on determining that the subset of the filter criteria data does not correspond to the requested communications type, determining default routing data as the routing data.

J: The CSCF of any of paragraphs G-I, wherein determining the routing data comprises determining the assisted voice communications system based at least in part on the filter criteria.

K: The CSCF of any of paragraphs G-J, wherein the operations further comprise receiving the filter criteria at the CSCF from a home subscriber server (HSS).

L: The CSCF of any of paragraphs G-K, wherein transmitting the second request comprises transmitting the second request to a session border controller (SBC) for transmission to the assisted voice communications system.

M: The CSCF of any of paragraphs G-L, wherein transmitting the second request comprises transmitting the second request to the video communications system for transmission to the destination UE.

N: The CSCF of any of paragraphs G-M, wherein the device identifier is one of: a telephone number; a mobile station international subscriber directory number (MSISDN); an international mobile subscriber identity (IMSI); or a network address.

O: A non-transitory computer-readable media storing computer-executable instructions that, when executed by one or more processors, cause the one or more processors to perform operations comprising: receiving, from a source user equipment (UE) at a call session control function (CSCF) configured at a wireless communications network, a first request to establish a communications session between the source UE and a destination UE; determining, at the CSCF and based at least in part on the first request, a requested communications type and a device identifier associated with the destination UE; determining, at the CSCF and based at least in part on the device identifier and routing data criteria data, a subset of the routing data associated with the destination UE; generating, based at least in part on the first request, a second request to establish the communications session between the source UE and the destination UE; transmitting, by the CSCF and based at least in part on the subset of the routing data, the second request to one of an assisted voice communications system or a video communications system; and establishing, via the wireless communications network and based at least in part on the second request, the communications session between the source UE and the destination UE.

P: The non-transitory computer-readable media of paragraph O, wherein the requested communications type is one of a video call or a voice call.

Q: The non-transitory computer-readable media of paragraph O or P, wherein determining the subset of the routing data is further based at least in part on the requested communications type.

R: The non-transitory computer-readable media of any of paragraphs O-Q, wherein: the first request is a session initiation protocol (SIP) INVITE message comprising an Accept-Contact header; and the Accept-Contact header comprises an indication of the requested communications type.

S: The non-transitory computer-readable media of paragraph R, wherein the indication of the requested communications type represents one of a multimedia telephony service voice call or a multimedia telephony service video call.

T: The non-transitory computer-readable media of paragraph R, wherein determining the subset of the routing data is further based at least in part on the Accept-Contact header.

While the example clauses described above are described with respect to one particular implementation, it should be understood that, in the context of this document, the content of the example clauses can also be implemented via a method, device, system, computer-readable medium, and/or another implementation. Additionally, any of the examples A-T can be implemented alone or in combination with any other one or more of the examples A T.

CONCLUSION

Depending on the embodiment, certain operations, acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, components, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks, modules, and components described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements, and/or states. Thus, such conditional language is not generally intended to imply that features, elements, and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Unless otherwise explicitly stated, articles such as "a" or "the" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
receiving, from a source user equipment (UE) at a serving call session control function (S-CSCF) configured at a wireless communications network, a first request to establish a communications session between the source UE and a destination UE;
determining, at the S-CSCF and based at least in part on the first request, a requested communications type and a device identifier associated with the destination UE;
determining, at the S-CSCF and based at least in part on the device identifier and initial filter criteria (iFC) data, routing data associated with the destination UE;
generating, based at least in part on the first request, a second request to establish the communications session between the source UE and the destination UE;
transmitting, by the S-CSCF and based at least in part on the routing data, the second request to one of a video relay service (VRS) system or a terminating telephony application server (T-TAS); and
establishing, via the wireless communications network and based at least in part on the second request, the communications session between the source UE and the destination UE.

2. The method of claim 1, wherein receiving the first request comprises:
receiving, from the source UE at a session border controller (SBC) configured at the wireless communications network, the first request; and
transmitting the first request from the SBC to the S-CSCF.

3. The method of claim 1, wherein determining the routing data associated with the destination UE comprises determining a subset of iFC data associated with the destination UE.

4. The method of claim 1, wherein determining the routing data is further based at least in part on the requested communications type.

5. The method of claim 4, wherein:
the requested communications type comprises a voice communications type; and
transmitting the second request comprises transmitting the second request to the VRS system based at least in part on the voice communications type.

6. The method of claim 4, wherein:
the requested communications type comprises a video communications type; and
transmitting the second request comprises transmitting the second request to the T-TAS based at least in part on the video communications type.

7. A call session control function (CSCF) comprising:
one or more processors;
one or more transceivers; and
non-transitory computer-readable media storing computer-executable instructions that, when executed by the one or more processors, cause the one or more processors to perform operations comprising:
receiving a first request from a source user equipment (UE) to establish a communications session between the source UE and a destination UE;
determining, based at least in part on the first request, a requested communications type and a device identifier associated with the destination UE;
determining, based at least in part on the device identifier and filter criteria data, routing data associated with the destination UE;
generating, based at least in part on the first request, a second request to establish the communications session between the source UE and the destination UE;
transmitting, based at least in part on the routing data, the second request to one of an assisted voice communications system or a video communications system; and
establishing, based at least in part on the second request, the communications session between the source UE and the destination UE.

8. The CSCF of claim 7, wherein determining the routing data comprises:
determining that no data of the filter criteria data is associated with the destination UE; and
based at least in part on determining that no data of the filter criteria data is associated with the destination UE, determining default routing data as the routing data.

9. The CSCF of claim 7, wherein determining the routing data comprises:
determining a subset of the filter criteria data associated with the destination UE; and
determining that the subset of the filter criteria data does not correspond to the requested communications type; and
based at least in part on determining that the subset of the filter criteria data does not correspond to the requested communications type, determining default routing data as the routing data.

10. The CSCF of claim 7, wherein determining the routing data comprises determining the assisted voice communications system based at least in part on the filter criteria.

11. The CSCF of claim 7, wherein the operations further comprise receiving the filter criteria at the CSCF from a home subscriber server (HSS).

12. The CSCF of claim 7, wherein transmitting the second request comprises transmitting the second request to a session border controller (SBC) for transmission to the assisted voice communications system.

13. The CSCF of claim 7, wherein transmitting the second request comprises transmitting the second request to the video communications system for transmission to the destination UE.

14. The CSCF of claim 7, wherein the device identifier is one of:
a telephone number;
a mobile station international subscriber directory number (MSISDN);
an international mobile subscriber identity (IMSI); or
a network address.

15. A non-transitory computer-readable media storing computer-executable instructions that, when executed by one or more processors, cause the one or more processors to perform operations comprising:
receiving, from a source user equipment (UE) at a call session control function (CSCF) configured at a wireless communications network, a first request to establish a communications session between the source UE and a destination UE;
determining, at the CSCF and based at least in part on the first request, a requested communications type and a device identifier associated with the destination UE;
determining, at the CSCF and based at least in part on the device identifier and routing data criteria data, a subset of the routing data associated with the destination UE;

generating, based at least in part on the first request, a second request to establish the communications session between the source UE and the destination UE;

transmitting, by the CSCF and based at least in part on the subset of the routing data, the second request to one of an assisted voice communications system or a video communications system; and establishing, via the wireless communications network and based at least in part on the second request, the communications session between the source UE and the destination UE.

16. The non-transitory computer-readable media of claim 15, wherein the requested communications type is one of a video call or a voice call.

17. The non-transitory computer-readable media of claim 16, wherein determining the subset of the routing data is further based at least in part on the requested communications type.

18. The non-transitory computer-readable media of claim 15, wherein:

the first request is a session initiation protocol (SIP) INVITE message comprising an Accept-Contact header; and the Accept-Contact header comprises an indication of the requested communications type.

19. The non-transitory computer-readable media of claim 18, wherein the indication of the requested communications type represents one of a multimedia telephony service voice call or a multimedia telephony service video call.

20. The non-transitory computer-readable media of claim 18 wherein determining the subset of the routing data is further based at least in part on the Accept-Contact header.

* * * * *